US008565118B2

(12) United States Patent
Shukla et al.

(10) Patent No.: US 8,565,118 B2
(45) Date of Patent: Oct. 22, 2013

(54) METHODS AND APPARATUS FOR DISTRIBUTED DYNAMIC NETWORK PROVISIONING

(75) Inventors: Amit Shukla, Sunnyvale, CA (US); Arthi Ayyangar, Sunnyvale, CA (US); Vijayabhaskar Annamalai Kalusivalingam, San Jose, CA (US); Quaizar Vohra, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 287 days.

(21) Appl. No.: 12/346,630

(22) Filed: Dec. 30, 2008

(65) Prior Publication Data

US 2010/0165876 A1    Jul. 1, 2010

(51) Int. Cl.
  *H04L 12/28* (2006.01)
(52) U.S. Cl.
  USPC ............ 370/254; 370/351; 370/389; 370/392
(58) Field of Classification Search
  USPC ............... 370/254, 255, 389, 401, 395.2, 442
  See application file for complete search history.

(56) References Cited

U.S. PATENT DOCUMENTS

| | | |
|---|---|---|
| 5,130,984 A | 7/1992 | Cisneros |
| 5,138,615 A | 8/1992 | Lamport et al. |
| 5,801,641 A | 9/1998 | Yang et al. |
| 6,011,779 A | 1/2000 | Wills |
| 6,073,089 A | 6/2000 | Baker et al. |
| 6,522,627 B1 | 2/2003 | Mauger |
| 6,633,548 B2 | 10/2003 | Bachmutsky et al. |
| 6,657,962 B1 | 12/2003 | Barri et al. |
| 6,775,230 B1 | 8/2004 | Watanabe et al. |
| 6,807,172 B1 | 10/2004 | Levenson et al. |
| 6,970,902 B1 | 11/2005 | Moon |
| 6,973,032 B1 | 12/2005 | Casley et al. |
| 6,985,486 B1 | 1/2006 | Agrawal |
| 7,027,412 B2 | 4/2006 | Miyamoto et al. |
| 7,069,413 B1 | 6/2006 | Agesen et al. |
| 7,075,934 B2 | 7/2006 | Chiussi et al. |
| 7,221,676 B2 | 5/2007 | Green et al. |
| 7,313,135 B2 | 12/2007 | Wyatt |

(Continued)

FOREIGN PATENT DOCUMENTS

| | | |
|---|---|---|
| EP | 0 809 380 A2 | 11/1997 |
| GB | 2 361 139 A | 10/2001 |

OTHER PUBLICATIONS

U.S. Appl. No. 12/346,608, filed Dec. 30, 2008, entitled "Methods and Apparatus Related to Data Transmissions Between Virtual Resources Via a Network Device" (80 pgs).

(Continued)

*Primary Examiner* — Anez Ebrahim
(74) *Attorney, Agent, or Firm* — Cooley LLP

(57) ABSTRACT

In one embodiment, a method includes detecting a virtual resource hosted by a host device, selecting a configuration template associated with the virtual resource, and providing a provisioning instruction to a virtual switch module hosted by the host device based on the configuration template. The host device is operatively coupled to a network device. The detecting is at the network device; the selecting is at the network device; and the providing is at the network device. The virtual switch module is in communication with the virtual resource. The configuration template associated with the virtual resource is selected from a library of configuration templates accessible to the network device.

18 Claims, 11 Drawing Sheets

(56) References Cited

U.S. PATENT DOCUMENTS

| | | | |
|---|---|---|---|
| 7,327,680 B1 | 2/2008 | Kloth | |
| 7,369,561 B2 | 5/2008 | Wybenga et al. | |
| 7,406,038 B1 | 7/2008 | Oelke et al. | |
| 7,409,487 B1 | 8/2008 | Chen et al. | |
| 7,415,034 B2 | 8/2008 | Muller et al. | |
| 7,428,219 B2 | 9/2008 | Khosravi | |
| 7,430,164 B2 | 9/2008 | Bare | |
| 7,441,268 B2 | 10/2008 | Remedios | |
| 7,580,415 B2 | 8/2009 | Hudson et al. | |
| 7,630,368 B2 | 12/2009 | Tripathi et al. | |
| 7,689,747 B2 | 3/2010 | Vega et al. | |
| 7,738,457 B2 | 6/2010 | Nordmark et al. | |
| 7,757,059 B1 | 7/2010 | Ofer et al. | |
| 7,788,411 B2 | 8/2010 | Belgaied et al. | |
| 7,836,212 B2 | 11/2010 | Tripathi et al. | |
| 8,045,546 B1 | 10/2011 | Bao et al. | |
| 8,050,256 B1 | 11/2011 | Bao et al. | |
| 2002/0118644 A1 | 8/2002 | Moir | |
| 2002/0194294 A1 | 12/2002 | Blumenau et al. | |
| 2003/0026287 A1 | 2/2003 | Mullendore et al. | |
| 2003/0065878 A1 | 4/2003 | Krishna et al. | |
| 2003/0076849 A1* | 4/2003 | Morgan et al. | 370/412 |
| 2003/0142668 A1 | 7/2003 | Wyatt | |
| 2004/0083245 A1* | 4/2004 | Beeler, Jr. | 707/204 |
| 2004/0151188 A1 | 8/2004 | Maveli et al. | |
| 2004/0177157 A1 | 9/2004 | Mistry et al. | |
| 2004/0205253 A1 | 10/2004 | Arndt et al. | |
| 2005/0038848 A1* | 2/2005 | Kaluskar et al. | 709/201 |
| 2005/0138308 A1* | 6/2005 | Morishita et al. | 711/162 |
| 2005/0177552 A1 | 8/2005 | Bass et al. | |
| 2005/0192969 A1 | 9/2005 | Haga et al. | |
| 2005/0198303 A1* | 9/2005 | Knauerhase et al. | 709/227 |
| 2006/0259952 A1 | 11/2006 | Lok | |
| 2007/0005685 A1* | 1/2007 | Chau et al. | 709/203 |
| 2007/0008949 A1 | 1/2007 | Balandin | |
| 2007/0014288 A1 | 1/2007 | Lim et al. | |
| 2007/0078988 A1 | 4/2007 | Miloushev et al. | |
| 2007/0079307 A1 | 4/2007 | Dhawan et al. | |
| 2007/0098408 A1 | 5/2007 | Handelman | |
| 2007/0140235 A1 | 6/2007 | Aysan et al. | |
| 2007/0204265 A1 | 8/2007 | Oshins | |
| 2007/0211716 A1 | 9/2007 | Oz et al. | |
| 2007/0219911 A1 | 9/2007 | Abe | |
| 2007/0244997 A1 | 10/2007 | Tindal | |
| 2007/0280243 A1 | 12/2007 | Wray et al. | |
| 2007/0280253 A1 | 12/2007 | Rooholamini et al. | |
| 2007/0283186 A1 | 12/2007 | Madnani et al. | |
| 2007/0288535 A1* | 12/2007 | Shitomi et al. | 707/204 |
| 2007/0297428 A1* | 12/2007 | Bose et al. | 370/401 |
| 2008/0002663 A1 | 1/2008 | Tripathi et al. | |
| 2008/0005344 A1 | 1/2008 | Ford et al. | |
| 2008/0019365 A1 | 1/2008 | Tripathi et al. | |
| 2008/0043756 A1 | 2/2008 | Droux et al. | |
| 2008/0043765 A1 | 2/2008 | Belgaied et al. | |
| 2008/0046610 A1 | 2/2008 | Tripathi et al. | |
| 2008/0046735 A1 | 2/2008 | Nedeltchev et al. | |
| 2008/0080548 A1 | 4/2008 | Mullendore et al. | |
| 2008/0082977 A1 | 4/2008 | Araujo et al. | |
| 2008/0095361 A1 | 4/2008 | Wifvesson et al. | |
| 2008/0098392 A1 | 4/2008 | Wipfel et al. | |
| 2008/0117909 A1 | 5/2008 | Johnson | |
| 2008/0130517 A1 | 6/2008 | Lee et al. | |
| 2008/0148341 A1 | 6/2008 | Ferguson | |
| 2008/0155223 A1 | 6/2008 | Hiltgen et al. | |
| 2008/0186875 A1 | 8/2008 | Kitani | |
| 2008/0192648 A1 | 8/2008 | Galles | |
| 2008/0201709 A1* | 8/2008 | Hodges | 718/1 |
| 2008/0205377 A1 | 8/2008 | Chao et al. | |
| 2008/0212592 A1 | 9/2008 | Wybenga et al. | |
| 2008/0219184 A1 | 9/2008 | Fowler et al. | |
| 2008/0225853 A1 | 9/2008 | Melman et al. | |
| 2008/0228781 A1 | 9/2008 | Chen et al. | |
| 2008/0240104 A1* | 10/2008 | Villait et al. | 370/392 |
| 2008/0240122 A1 | 10/2008 | Richardson et al. | |
| 2008/0244579 A1 | 10/2008 | Muller | |
| 2008/0259934 A1 | 10/2008 | Matthews et al. | |
| 2008/0270564 A1 | 10/2008 | Rangegowda et al. | |
| 2009/0013062 A1 | 1/2009 | Blatherwick et al. | |
| 2009/0025007 A1 | 1/2009 | Hara et al. | |
| 2009/0037680 A1 | 2/2009 | Colbert et al. | |
| 2009/0052461 A1 | 2/2009 | Brown et al. | |
| 2009/0083445 A1 | 3/2009 | Ganga | |
| 2009/0106409 A1 | 4/2009 | Murata | |
| 2009/0106766 A1 | 4/2009 | Masuda | |
| 2009/0109479 A1 | 4/2009 | Kato | |
| 2009/0135816 A1 | 5/2009 | Nandagopal et al. | |
| 2009/0150529 A1* | 6/2009 | Tripathi | 709/222 |
| 2009/0157701 A1 | 6/2009 | Lahiri et al. | |
| 2009/0190598 A1 | 7/2009 | Christensen et al. | |
| 2009/0198761 A1 | 8/2009 | Nanda et al. | |
| 2009/0240790 A1* | 9/2009 | Utsunomiya et al. | 709/221 |
| 2009/0274044 A1 | 11/2009 | Goose et al. | |
| 2009/0276772 A1 | 11/2009 | Garrett et al. | |
| 2009/0276774 A1* | 11/2009 | Kinoshita | 718/1 |
| 2009/0292858 A1* | 11/2009 | Lambeth et al. | 711/6 |
| 2009/0307597 A1 | 12/2009 | Bakman | |
| 2009/0313620 A1 | 12/2009 | Sedukhin et al. | |
| 2010/0027420 A1 | 2/2010 | Smith | |
| 2010/0042708 A1 | 2/2010 | Stamler et al. | |
| 2010/0042719 A1 | 2/2010 | Kinoshita | |
| 2010/0043068 A1 | 2/2010 | Varadhan et al. | |
| 2010/0050172 A1 | 2/2010 | Ferris | |
| 2010/0054129 A1 | 3/2010 | Kuik et al. | |
| 2010/0077158 A1 | 3/2010 | Asano et al. | |
| 2010/0091961 A1 | 4/2010 | Jones et al. | |
| 2010/0128605 A1 | 5/2010 | Chavan et al. | |
| 2010/0131636 A1 | 5/2010 | Suri et al. | |
| 2010/0165877 A1 | 7/2010 | Shukla et al. | |
| 2010/0169467 A1 | 7/2010 | Shukla et al. | |
| 2011/0019550 A1 | 1/2011 | Bryers et al. | |
| 2011/0096781 A1 | 4/2011 | Aybay | |
| 2011/0103259 A1 | 5/2011 | Aybay et al. | |

OTHER PUBLICATIONS

U.S. Appl. No. 12/346,612, filed Dec. 30, 2008, entitled "Methods and Apparatus Related to Data Transmissions Between Virtual Resources At a Host Device" (78 pgs).

U.S. Appl. No. 12/346,615, filed Dec. 30, 2008, entitled "Methods and Apparatus for Routing Between Virtual Resources Based on a Routing Location Policy" (79 pgs).

U.S. Appl. No. 12/346,618, filed Dec. 30, 2008, entitled "Methods and Apparatus for Provisioning at a Network Device in Response to a Virtual Resource Migration Notification" (80 pgs).

U.S. Appl. No. 12/346,625, filed Dec. 30, 2008, entitled "Methods and Apparatus Related to Managing Communications Between Virtual Resources" (43 pgs).

U.S. Appl. No. 12/612,210, filed Nov. 4, 2009, entitled "Methods and Apparatus for Configuring a Virtual Network Switch" (50 pgs).

Office Action mailed Sep. 17, 2010 for U.S. Appl. No. 12/346,608 (28 pages).

Office Action mailed Sep. 15, 2010 for U.S. Appl. No. 12/346,615 (21 pages).

Office Action mailed Sep. 15, 2010 for U.S. Appl. No. 12/346,618 (13 pages).

Office Action mailed Sep. 17, 2010 for U.S. Appl. No. 12/346,625 (24 pages).

Office Action mailed Oct. 5, 2010 for U.S. Appl. No. 12/346,632 (16 pages).

Partial European Search Report completed Jan. 25, 2011 for European Application No. 10188736.2 (7 page).

Cisco: "Cisco VN-Link: Virtualization-Aware Networking," Cisco Public Information, Cisco Systems, [Online] Mar. 1, 2009 (pp. 1-10), XP002593596, Retrieved from the Internet: <URL: http://www.cisco.com/en/US/solutions/collateral/ns340/ns517/ns224/ns892/ns894/white_paper_c11-525307.pdf> [retrieved on Jul. 26, 2010].

Office Action mailed Dec. 23, 2010 for U.S. Appl. No. 12/346,623 (19 pages).

Office Action mailed Jun. 16, 2011 for U.S. Appl. No. 12/346,623 (13 pages).

(56) References Cited

OTHER PUBLICATIONS

Office Action mailed Apr. 14, 2011 for U.S. Appl. No. 12/346,608 (24 pages).
Office Action mailed Apr. 1, 2011 for U.S. Appl. No. 12/346,612 (19 pages).
Office Action mailed Mar. 21, 2011 for U.S. Appl. No. 12/346,615 (9 pages).
Office Action mailed Apr. 7, 2011 for U.S. Appl. No. 12/346,618 (14 pages).
Office Action mailed Mar. 29, 2011 for U.S. Appl. No. 12/346,625 (13 pages).
Office Action mailed Mar. 14, 2011 for U.S. Appl. No. 12/346,632 (21 pages).
Partial European Search Report dated Mar. 4, 2011 for European Application No. 10187574.8 (6 pages).
U.S. Appl. No. 12/976,508, filed Dec. 22, 2010, entitled "Methods and Apparatus for Tunnel Management Within a Data Center" (42 pgs).
U.S. Appl. No. 12/981,678, filed Dec. 30, 2010, entitled "Apparatus, Systems and Methods for Aggregate Routes Within a Communications Network" (38 pgs).
Final Office Action mailed Jul. 26, 2011 for U.S. Appl. No. 12/346,608.
Office Action mailed Jan. 17, 2012 for U.S. Appl. No. 12/346,608.
Final Office Action mailed Dec. 5, 2011 for U.S. Appl. No. 12/346,612.
Final Office Action mailed Dec. 14, 2011 for U.S. Appl. No. 12/346,625.
Final Office Action mailed Aug. 15, 2011 for U.S. Appl. No. 12/346,632.
Office Action mailed Dec. 21, 2011 for U.S. Appl. No. 12/346,632.
Extended European Search Report mailed Aug. 17, 2011 for European Application No. 10187574.8.
Partial European Search Report dated Feb. 4, 2011 for European Application No. 10188736.2.
Extended European Search Report dated May 10, 2011 for European Application No. 10188736.2.
Office Action mailed Jul. 3, 2012 for U.S. Appl. No. 12/346,625.
Office Action mailed Jun. 26, 2012 for U.S. Appl. No. 12/607,162.

\* cited by examiner

```
          Configuration Template template{
  T1{
    ID 1;
    VLAN 23;
    ACL {VLAN=23;PORT=80; . . . };
    .
    .
    .
  }
  T2{
    ID 2;
    VLAN 43;
    ACL {VLAN=43,23;PORT=80; . . . };
    .
    .
    .
  }
  .
  .
  .
}
```

FIG. 7

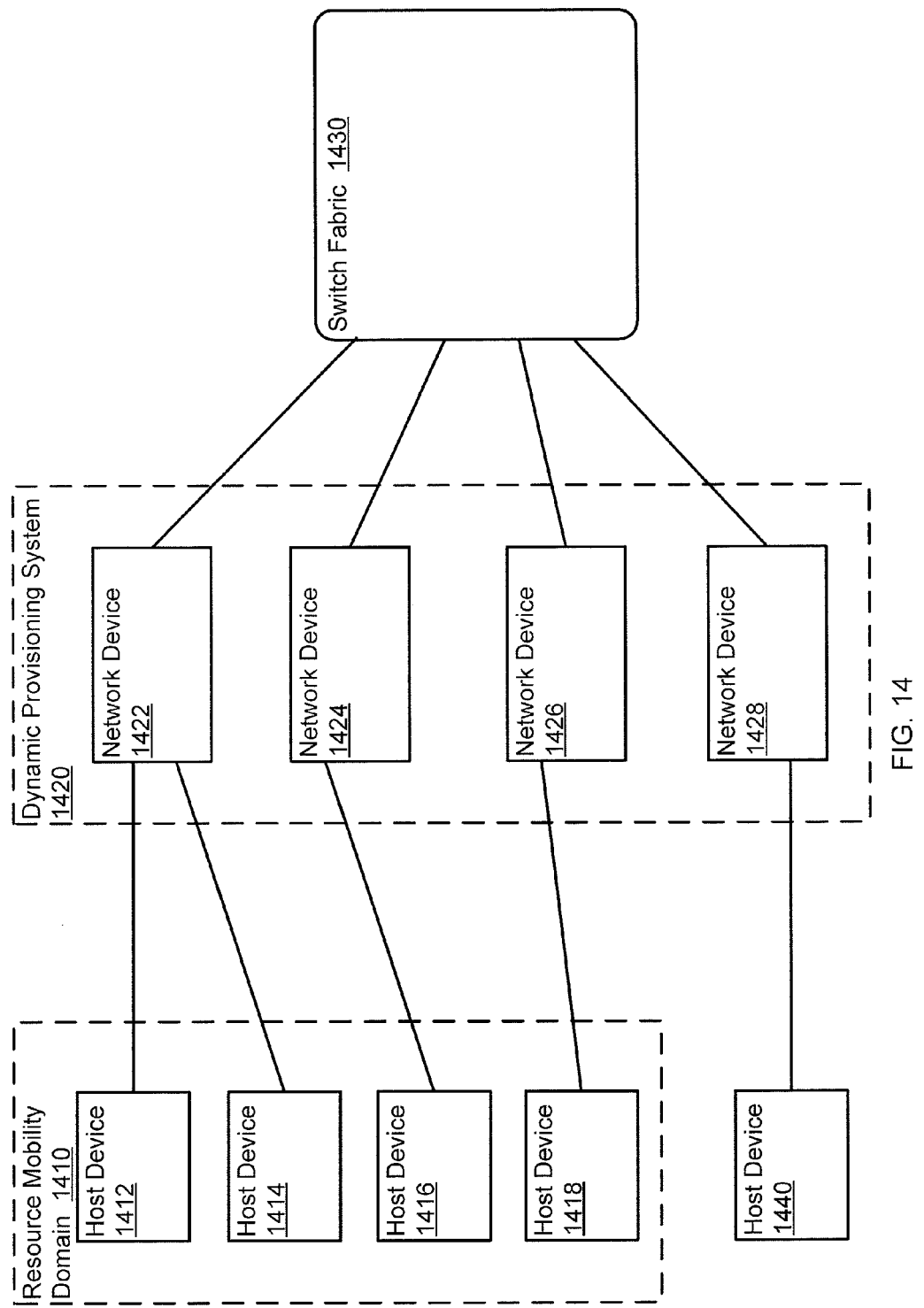

METHODS AND APPARATUS FOR DISTRIBUTED DYNAMIC NETWORK PROVISIONING

RELATED APPLICATION

This application is related to a U.S. patent application Ser. No. 12/346,632, filed on Dec. 30, 2008, (now U.S. Pat. No. 8,331,362), and entitled, "Methods and Apparatus for Distributed Dynamic Network Provisioning," which is incorporated herein by reference in its entirety.

BACKGROUND

Some embodiments relate generally to methods and apparatus for dynamic distributed provisioning in a network including, for example, provisioning of network resources by network devices. Some embodiments relate more specifically to providing distributed provisioning of virtual computing resources by network devices such as access switches in a switch fabric within a data center.

Virtualized environments or enterprises such as those in data centers include virtual computing resources or virtual machines that execute or are hosted on physical servers. Multiple virtual machines can be hosted by a single physical server. Virtual machines can be configured to perform most functions that physical servers perform. Use of virtual machines can be beneficial for, for example, efficient use of physical computing resources, fault tolerance of physical computing resources, and continued service during maintenance of physical computing resources.

Virtual machines can also introduce additional complexity in a network environment. For example, to provide fault tolerance of physical computing resources, virtual machines typically migrate or are transferred from a first server to a second server. In large-scale network environments such as, for example, data center environments, migration of virtual machines typically involves provisioning or configuration of network ports and/or network devices such that network traffic is routed from the first server to the second server after the migration. Some known network management solutions pre-provision the network ports and/or devices in the network. Although pre-provisioning addresses the need to provision network ports and/or devices after migration of a virtual machine, it can result in inefficient usage of forwarding path resources. For example, pre-provisioning includes defining or reserving IP addresses before they are used, processing data packets at network switches for virtual resources that are not operatively coupled to those network switches, and forwarding network traffic to network ports (or virtual ports) that are not yet connected to a particular virtual machine. Additionally, this situation can be a security concern because network traffic can be forwarded to network ports on servers with no virtual machine or service active at those network ports.

Other known network management solutions rely on complex management and policy orchestration tools to manage migration and provisioning of network ports and/or devices. Such known tools typically provision the network ports and/ or devices based on a description of the network topology provided a priori by a system administrator. These known tools typically rely on such a description to determine which network ports and/or switches will be provisioned after migration of a virtual machine. Such descriptions can be difficult to compile, maintain, and verify, resulting in additional complexity for the network administrator and significant opportunities for misconfiguration of network ports and/ or devices. Additionally, because such descriptions are provided a priori, such tools can impose static requirements on the topology of networks. Thus, a need exists for improved, dynamic provisioning in networks.

SUMMARY OF THE INVENTION

In one embodiment, a method includes detecting a virtual resource hosted by a host device, selecting a configuration template associated with the virtual resource, and providing a provisioning instruction to a virtual switch module hosted by the host device based on the configuration template. The host device is operatively coupled to a network device. The detecting is at the network device; the selecting is at the network device; and the providing is at the network device. The virtual switch module is in communication with the virtual resource. The configuration template associated with the virtual resource is selected from a library of configuration templates accessible to the network device. In some embodiments, the method further comprises provisioning a local port on the network device based on the configuration template.

BRIEF DESCRIPTION OF THE DRAWINGS

FIG. 7 is a textual representation of configuration template, according to an embodiment.

FIG. 14 is a system block diagram of a network within a data center including a dynamic provisioning system, according to an embodiment.

DETAILED DESCRIPTION

Network ports and/or devices in a network can be dynamically provisioned after migration of a virtual resource within the network without a management orchestration tool. For example, a network can include multiple network devices such as network switches, each storing a library of configuration templates including provisioning instructions for services provided over the network by virtual machines in the network. When a virtual machine migrates to and/or is instantiated or started on a server connected to a port of a network switch, the server can send to the switch an identifier related to a service provided by the virtual machine. The network device can select a configuration template from the library of configuration templates based on the identifier, and provision the port and/or the server based on the configuration template. Thus, the task of provisioning network ports and/or devices can be distributed across switches in the network and vary dynamically as virtual machines or resources are migrated among servers within the network.

As used in this specification, provisioning can include various types or forms of device and/or software module setup, configuration, and/or adjustment. For example, provisioning can include configuring a network device such as a network switch based on a network policy. More specifically, for example, network provisioning can include one or more of the following: configuring a network device to operate as a network router or a network switch; alter routing tables of a network device; update security policies and/or device addresses or identifiers of devices operatively coupled to a network device; selecting which network protocols a network device will implement; setting network segment identifiers such as virtual local area network ("VLAN") tags for a port of a network device; and/or applying access control lists ("ACLs") to a network device. The network switch can be provisioned or configured such that rules and/or access restrictions defined by the network policy are applied to data packets that pass through the network switch. In some embodiments, virtual devices can be provisioned. A virtual device can be, for example, a software module implementing a virtual switch, virtual router, or virtual gateway that is configured to operate as an intermediary between a physical network and virtual resources hosted by a host device such as a server. In some embodiments, the virtual switch is hosted by the host device. In some embodiments, provisioning can include establishing a virtual port or connection between a virtual resource and a virtual device.

As used in this specification, the singular forms "a," "an" and "the" include plural referents unless the context clearly dictates otherwise. Thus, for example, the term "a host device" is intended to mean one or more host devices or a combination of host devices, "network device" is intended to mean one or more network devices, or a combination thereof.

Figure 1:
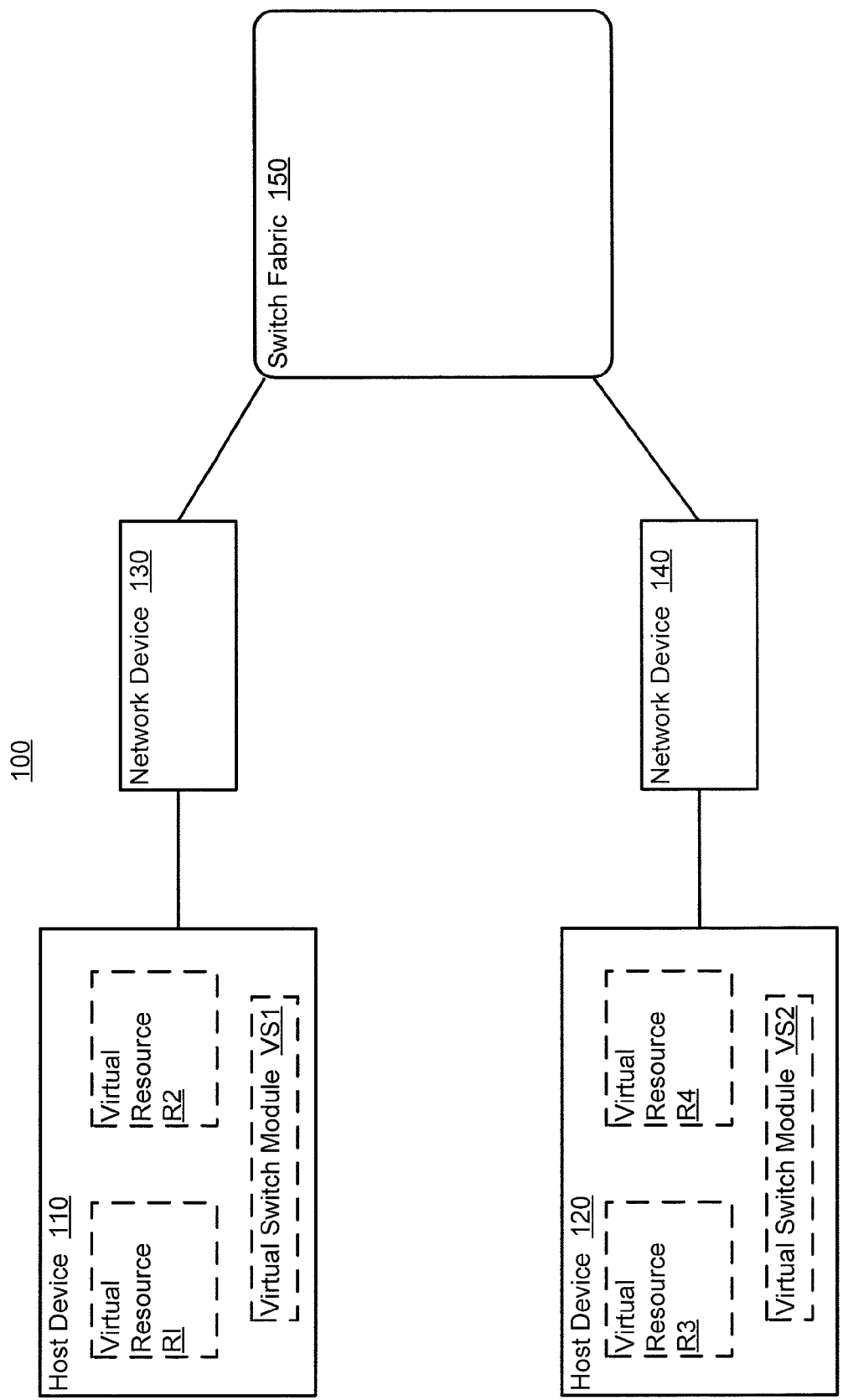
FIG. 1 is a system block diagram of a data center network, according to an embodiment.

FIG. 1 is a system block diagram of a data center network 100, according to an embodiment. As illustrated in FIG. 1, network 100 includes host device 110, host device 120, network device 130, network device 140, and switch fabric 150. In some embodiments, however, a network can include additional network devices. In some embodiments, for example, a system can include 1024, 2048, 4096, or more network devices. Host device 110 is operatively coupled to network device 130; host device 120 is operatively coupled to network device 140; and network device 130 and network device 140 are operatively coupled to switch fabric 150. In some embodiments, multiple host devices can be operatively coupled or connected to a network device.

As illustrated in FIG. 1, host devices 110 and 120 host (or execute) virtual resources R1 and R2, and R3 and R4, respectively. Additionally, host devices 110 and 120 host (or execute) virtual switch modules VS1 and VS2, respectively. Virtual resources R1, R2, R3, and R4 can be any of a variety of software modules running on a host device. For example, a virtual resource can be a web server, a file server, a guest operating system in a virtual machine, or a network service such as, for example, local directory access protocol ("LDAP"). Virtual switch modules typically operate as a gateway between virtual resources hosted by a host device and a physical network interface such as a network interface card ("NIC"). For example, host device 110 can be operatively coupled to network device 130 via a NIC. Virtual switch module VS1 can be in communication with the NIC to send data packets received by the NIC to virtual resources R1 and R2 based on a destination address of the data packets. Additionally, virtual switch module VS1 can receive data packets from virtual resources R1 and R2, and provide those data packets to the NIC to be forwarded via network device 130, switch fabric 150, and network device 140 to a destination such as, for example, virtual resource R4.

Figure 2:
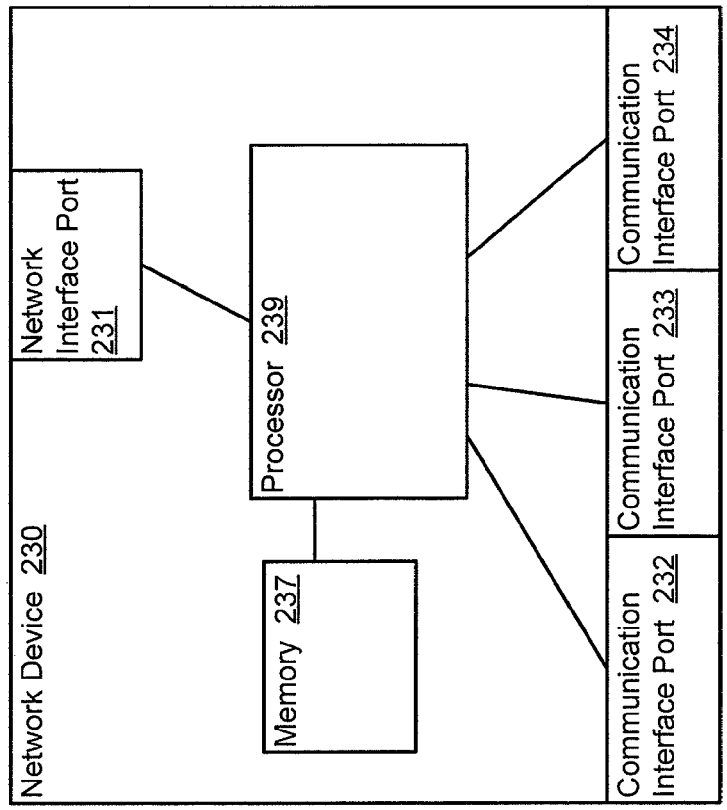
FIG. 2 is system block diagram of a network device, according to an embodiment.

Network device 130 and network device 140 can be, for example, a switch, router, gateway, bridge, and/or other network device configured to provide host device 110 and host device 120 with access to switch fabric 150. FIG. 2 is system block diagram of a network device, according to an embodiment. Network device 230 includes processor 239 operatively coupled to memory 237, network interface port 231, communication interface port 232, communication port 233, and communication port 234. Processor 239 is configured to communicate with computing devices such as host devices (e.g., servers in a network) via communication interface port 232, communication interface port 233, and communication interface port 234. In some embodiments, network device 230 can include more or fewer communication interface ports than are illustrated in FIG. 2. Network device 230 can include, for example, 64, 128, 256, or more communication interface ports.

Network device 230 is configured to receive data packets and forward the data packets to one or more of network interface port 231, communication interface port 232, communication interface port 233, and/or communication interface port 234 based on parameters of the data packets. In some embodiments, network device 230 can be operatively coupled to a switch fabric such as switch fabric 150 in FIG. 1, and communication interface ports 232, 233, and/or 234 can be operatively coupled to host devices such as host devices 110 and 120 in FIG. 1. In some embodiments, host devices operatively coupled to network devices (which are operatively coupled to a common switch fabric) can communicate one with another via the network devices and a switch fabric. For example, a data packet received via network interface port 231 can include a destination parameter having a value associated with an identifier of a host device connected to communication interface port 233. Processor 239 can determine to which communication interface port, if any, the packet should be forwarded based on, for example, data stored in memory 237. Because the data packet includes a destination address (or parameter) having a value associated with an identifier of a host device connected to communication interface port 233, processor can determine that the data packet should be forwarded to communication interface port 233. In some embodiments, memory 237 can include rules and/or access control lists ("ACLs") that can be satisfied by parameters of the data packet before processor 239 will forward the data packet. For example, a rule can specify that a source address parameter of the data packet includes a value in a range of values specified in the rule. If the value is outside of the specified range of values, the data packet will not be forwarded to communication interface 233.

In some embodiments, network device 230 can be configured as a network switch such as an access switch coupled to a switch fabric. In some embodiments, network device 230 can be configured as a network router, network hub, network gateway, or network bridge.

In some embodiments, network device 230 can include a control interface port (not shown). The control interface port can be used for communicating with, for example, an administration device such as a network management module and/or an external management entity (not shown in FIG. 1 or 2). For example, a network management module can be incorporated into a control plane of a network appliance or a switch fabric, and network device 230 can be operatively coupled to the control plane of the network appliance via the control interface. In other embodiments, network device 230 can communicate with a network management module via 231 network interface port and/or one or more of communication interface port 232, communication interface port 233, and communication interface port 234.

In some embodiments, memory 237 is configured to store a library of configuration templates. A configuration template can include, for example, a configuration template identifier and provisioning (or configuration) instructions for provisioning a network port or device. Processor 239 can be configured to select a configuration template from the library of configuration templates stored in memory 237, and provision one or more of communication interface port 232, communication interface port 233, and communication interface port 234 based on the configuration template. Additionally, in some embodiments, processor 239 is configured to provision a host device operatively coupled to one of communication interface port 232, communication interface port 233, and communication interface port 234 based on the configuration template. In some embodiments, processor 239 is configured to provision a virtual switch module hosted by host device operatively coupled to one of communication interface port 232, communication interface port 233, and communication interface port 234 based on the configuration template.

Figure 3:
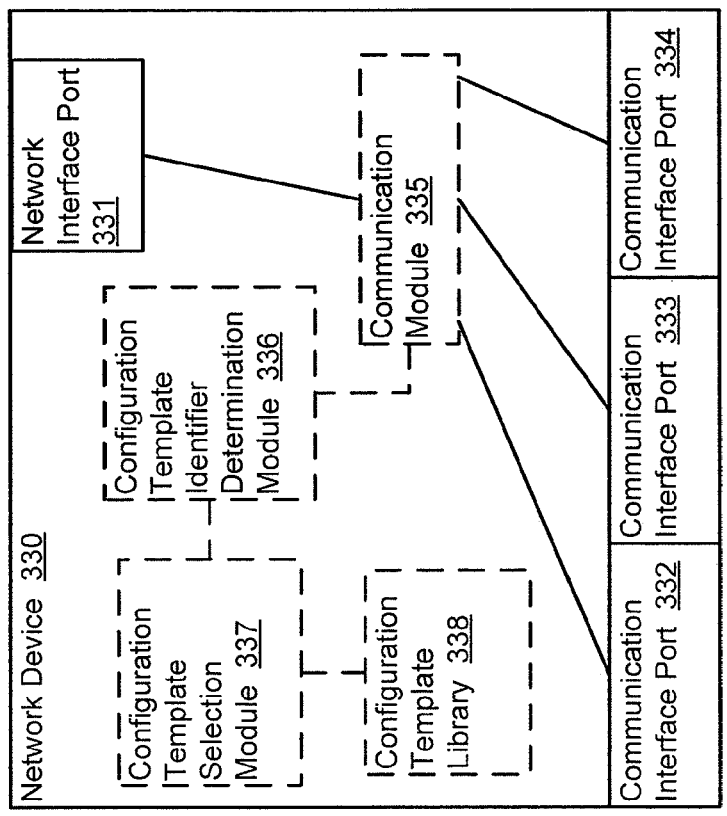
FIG. 3 is a logical system block diagram of a network device, according to an embodiment.

FIG. 3 is logical system block diagram of a network device, according to an embodiment. Processor 239 and/or memory 237 of network 230 shown in FIG. 2 can be configured to include communication module 335, configuration template identifier determination module 336, configuration template selection module 337, and configuration template library 338. Communication module 335 can be hardware and/or software configured to communicate with communication ports 332-334 and/or network interface port 331. In some embodiments, communication module 335 includes a combination of hardware and/or software modules. For example, communication module 335 can include an Ethernet network stack and Ethernet physical interface module configured to communicate with devices operatively coupled to communication interface ports 332-334 via an Ethernet protocol. Communication module 335 can also include and a switch fabric protocol stack, a data plane interface module, and a control plane module configured to communicate with a switch fabric having a control plane and a data plane.

Communication module 335 is operatively coupled to configuration template identifier determination module 336. Configuration template identifier determination module 336 is configured to receive from communication module 335 a device identifier and determine a configuration template identifier based on the device identifier. In some embodiments, configuration template identifier determination module 336 can be configured to extract a configuration template identifier from a device identifier based on, for example, a bit mask or a byte mask. In some embodiments, a portion of a device identifier can be configuration template identifier. For example, the first sixteen bits in a 48-bit device identifier can represent a configuration template identifier. Thus, sixteen bits of the device identifier can identify a configuration template related to the virtual resource or a device with which the device identifier is associated, and the remaining thirty two bits can be a unique or semi-unique (e.g., unique within a particular network or network segment) device identifier associated with the virtual resource or device. In some embodiments, configuration template identifier determination module 336 is configured to extract an index value from a device identifier and select a configuration template identifier from a table based on the index value. In some embodiments, the entire device identifier can be an index value.

Configuration template identifier determination module 336 can be configured to provide the configuration template identifier to configuration template selection module 337. Configuration template selection module 337 can be configured to receive a configuration template identifier from configuration template identifier determination module 336 and select a configuration template from, for example, configuration template library 338 based on the configuration template identifier. In some embodiments, configuration template selection module 337 can be configured to select a configuration template from a database including a library of configuration templates that is external to network device 330. For example, multiple network devices can have access to a single database including a library of configuration templates. Thus, in some embodiments, the library of configuration templates need not be updated separately for each network device in a system or network.

In some embodiments, one or more of communication module 335, configuration template identifier determination module 336, configuration template selection module 337, and/or configuration template library 338 can be combined into a single module. Thus, in some embodiments, configuration template identifier determination module 336 and configuration template selection module 337 can be a single module. For example, a module can receive a device identifier from communication module 335, and determine a configuration template based on the device identifier without providing a configuration template identifier to a separate module.

Figure 4:
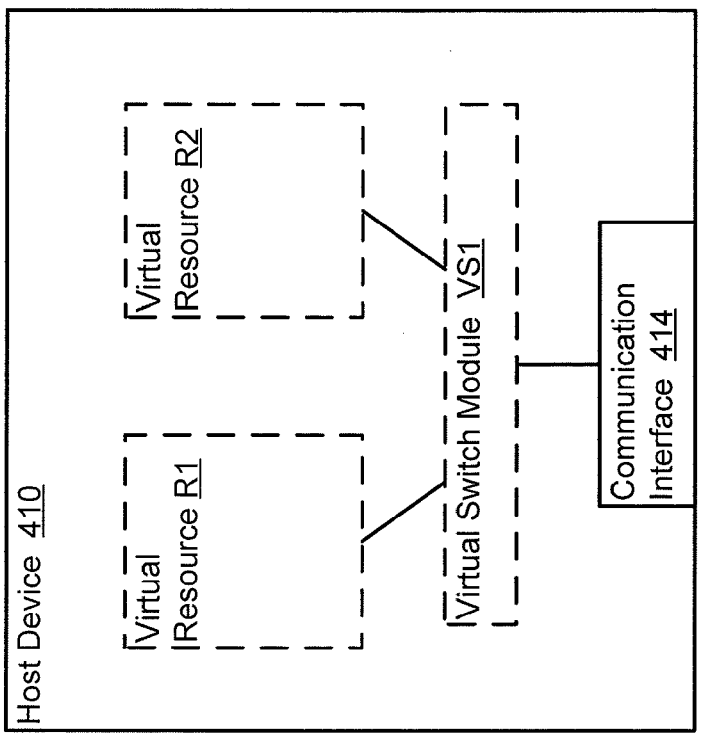
FIG. 4 is a logical system block diagram of a host device including a group of virtual resource, according to an embodiment.

FIG. 4 is a logical system block diagram of a host device including a group of virtual resources, according to an embodiment. Host device 410 can be any computing device capable of hosting, running, operating, and/or executing virtual resources. In some embodiments, a server can be a host device. In some embodiments, the host device is dedicated, configured, and/or optimized for a particular virtual resource or class of virtual resources. For example, a host device can be optimized to host virtual resources such as web servers in general, or a particular web server; file servers in general, or a particular file server or file serving protocol; or to perform network services in general, or a particular network service such as, for example, local directory access protocol ("LDAP"). As illustrated in FIG. 4, host device 410 includes virtual resource R1 and virtual resource R2 operatively coupled to virtual switch module VS1. Virtual switch module VS1 is operatively coupled to communication interface 414.

Virtual resource R1 and virtual resource R2 can be, for example, software modules including network services such as web servers, dynamic host configuration protocol ("DHCP") servers, file transfer protocol ("FTP") servers, file servers, and/or other software modules. In some embodiments, virtual resource R1 and virtual resource R2 are virtual machines or virtual network appliances. Virtual machines and virtual network appliances can be software modules that are configured to emulate computing devices such as general purpose computers and/or specialized computing devices including network appliances.

Virtual resource R1 and virtual resource R2 are configured to communicate with a network via virtual switch module VS1. Virtual switch module VS1 is configured to operate as a bridge between, for example, a physical network to which host device 410 is operatively coupled via communication interface 414, and virtual resources R1 and R2.

Virtual switch module VS1 can be a software module (operating at a processor) or a portion of a processor configured to communicate with virtual resource R1, virtual resource R2, and communication interface 414. Communication interface 414 is typically a physical communication interface such as a network interface card ("NIC") or a portion of a software network stack associated with a NIC. In some embodiments, virtual switch module VS1 can be integrated with a software network stack associated with a NIC. In other words, virtual switch module VS1 can be a portion of a NIC network stack. In some embodiments, a virtual switch module can be a hardware module or a portion of a hardware module. For example, a virtual switch module can be a hardware-based NIC. In other words, a virtual switch module can be implemented in software and/or embedded in hardware.

Figure 5:
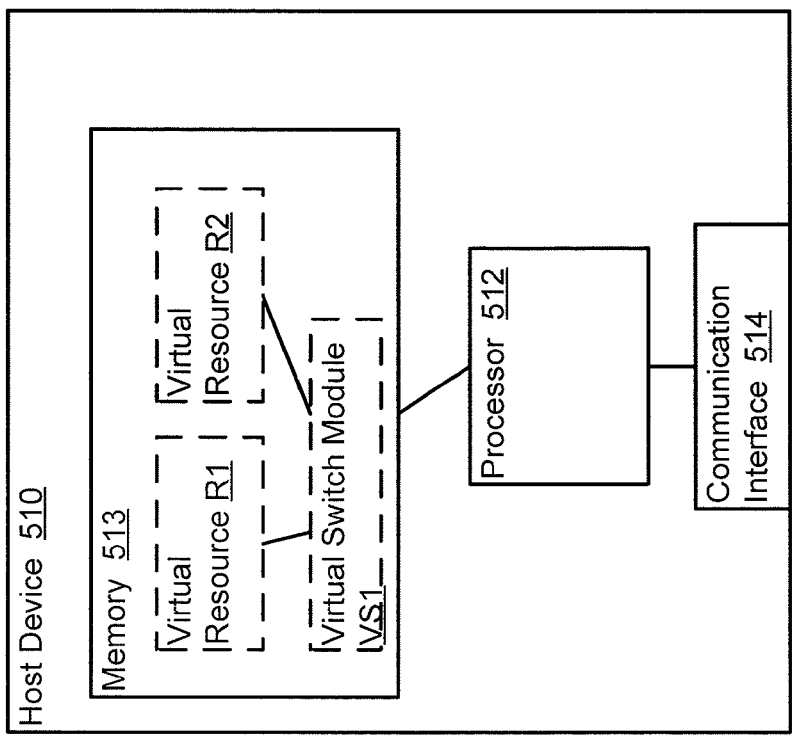
FIG. 5 is a system block diagram of a host device including a group of virtual resources, according to an embodiment.

FIG. 5 is a system block diagram of a host device including a group of virtual resources, according to an embodiment. As shown in FIG. 5, host device 510 includes a processor 510 operatively coupled to memory 513 and communication interface 514. In some embodiments, memory 513 is configured to store code that can be interpreted or decoded by processor 512 to cause processor 512 to execute virtual resource R1, virtual resource R2, and virtual switch module VS1. Said differently, in some embodiments, virtual resource R1, virtual resource R2, and virtual switch module VS1 are logical constructs that can be represented by code and/or data in memory 513 and processor 512 executes the code and interprets the data to provide the functionality of or implement virtual resource R1, virtual resource R2, and/or virtual switch module VS1.

Communication interface 514 is configured to be operatively coupled to a network or other computing or network device. For example, host device 510 can be operatively coupled to another host device or a network device via communication interface 514. Processor 512 can communicate with the network or other computing or network device via communication interface 514. For example, a data packet can be received by processor 512 via communication interface 514. Processor 512 can execute code representing virtual switch module VS1 to determine to if the data packet should be forwarded to one or both of virtual resource R1 and virtual resource R2. If processor 512 determines that the data packet should be forwarded to, for example, virtual resource R1, processor 512 can execute code associated with virtual switch VS1 and/or code associated with virtual resource R1 such that the data packet is forwarded or transferred to a portion of memory 513 representing a data packet input of virtual resource R1. Processor 512 can then execute code representing virtual resource R1 to process and/or respond to the data packet by, for example, providing a response to the source of the data packet via virtual switch module VS1 and communication interface 514. In some embodiments, a virtual switch module can be a hardware module.

Referring now to FIG. 1, host device 110 includes or hosts virtual resource R1, virtual resource R2, and virtual switch module VS1. Virtual switch module VS1 is in communication with virtual resource R1 and virtual resource R2. Similarly, host device 120 includes or hosts virtual resource R3, virtual resource R4, and virtual switch module VS2. Virtual switch module VS2 is in communication with virtual resource R3 and virtual resource R4. In some embodiments, virtual resource R1 and/or virtual resource R2 can migrate (or be transferred) from host device 110 to host device 120 such that virtual switch module VS2 is in communication with virtual resource R3, virtual resource R4, and virtual resource R1 and/or virtual resource R2. In some embodiments, virtual resource R3 and/or virtual resource R4 can migrate (or be transferred) from host device 120 to host device 110 such that virtual switch module VS2 is in communication with virtual resource R1, virtual resource R2, and virtual resource R3 and/or virtual resource R4.

In some embodiments, network device 140 is configured to detect or determine that virtual resource R1 and/or virtual resource R2 has migrated to host device 120. Network device 140 is configured to select or access a configuration template or provisioning instructions (or provisioning parameters) based on an identifier related to virtual resource R1 and/or virtual resource R2. Additionally, network device 140 is configured to provision one or more ports of network device 140, host device 120, and/or virtual switch module VS2 based on the configuration template such that other devices connected to switch fabric 150 can communicate with virtual resource R1 and/or virtual resource R2 via network device 140.

In some embodiments, network device 130 is similarly configured with respect to host device 110 and virtual switch module VS1. In other words, network device 130 is configured to detect or determine that virtual resource R3 and/or virtual resource R4 has migrated to host device 110, and determine a configuration template or provisioning parameters based on an identifier related to virtual resource R3 and/or virtual resource R4. In other embodiments, network device 130 is configured to detect another event related to a virtual resource such as, for example, instantiation of a virtual resource, a resume event of a virtual resource, and/or a suspend event of a virtual resource. Further, network device 130 is configured to provision one or more ports of network device 130, host device 110, and/or virtual switch module VS1 based on the configuration template such that other device connected to switch fabric 150 can communicate with virtual resource R3 and/or virtual resource R4 via network device 130.

In some embodiments, network device 140 is configured to detect or determine that virtual resource R3 and/or virtual resource R4 is no longer hosted by host device 120. For example, network device can detect that virtual resource R3 has migrated from host device 120 or has been shutdown. Network device 140 can determine a deprovisioning instruction based on the detection or determination, and provide the deprovisioning instruction to, for example, virtual switch module VS2 or a port of network device 140 to which host device 120 is connected. Similarly, in some embodiments, network device 130 is configured to detect or determine that virtual resource R1 and/or virtual resource R2 is no longer hosted by host device 110. Network device 130 can determine a deprovisioning instruction based on the detection or determination, and provide the deprovisioning instruction to, for example, virtual switch module VS1 or a port of network device 130 to which host device 110 is connected. In some embodiments, network device 130 can receive a notification from another device such as, for example, network device 140, an external management entity (not shown), or some other device (not shown) that a port should be deprovisioned in response to, for example, a virtual resource migration, instantiation, suspension, and/or resume event. In some embodiments, network device 130 can deprovision the port in response to the notification.

In some embodiments, deprovisioning can be based on one or more events and/or notifications. In some embodiments, an external management entity can provide and instruction or command (such as a provisioning instruction) to a network device to cause the network device to deprovision a port of the network device. For example, an external management entity can cause a virtual resource to migrate from one host to another, and the external management entity can cause a network device operatively coupled to the host device from with the virtual resource will migrate to deprovision the port operatively coupled to that host device. In some embodiments, a host device or a software module (such as a hypervisor or other virtual resource management module) running at a host device can provide a notification that a port of a network device should be deprovisioned. In some embodiments, a host device or a software module running at a host device can provide a command to a network device to deprovision a port of the network device. In some embodiments, a network device can detect that a port should be deprovisioned based on a timeout. For example, if no data for a virtual resource is received at a network device operatively coupled to the virtual resource for a period of time exceeding a timeout value, the network device can determine that the port operatively coupled to the virtual resource should be deprovisioned for the virtual device. In some embodiments, the network device can detect that no data has been sent to and/or from the virtual resource for a period of time exceeding the timeout value. In some embodiments, the network device can deprovision the port based on an instruction, a command, or a timeout value.

Figure 6:
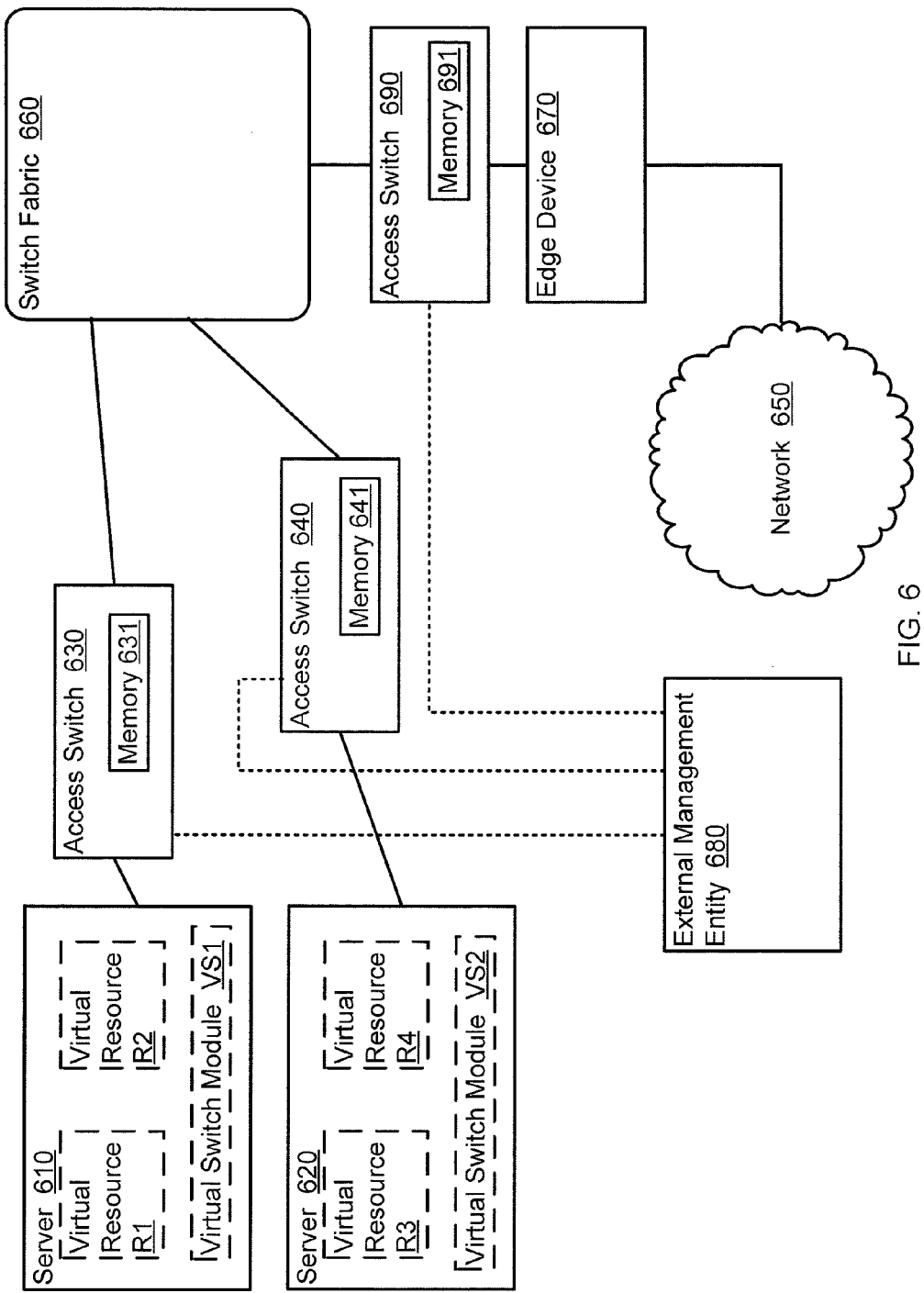
FIG. 6 is a system block diagram of another data center network and a network outside the data center network, according to another embodiment.

FIG. 6 is a system block diagram of another data center network, according to another embodiment. Server 610, server 620, access switch 630, access switch 640, access switch 690, edge device 670, and switch fabric 660 can be included in a data plane of the data center network. Server 610, server 620, access switch 630, access switch 640, access switch 690, edge device 670, switch fabric 660, and external management entity 680 can be included in a management plane of the data center network. External management entity 680 is referred to as "external" because in some embodiments, external management entity 680 is external to or outside of the data plane of the data center network.

Server 610 is operatively coupled to access switch 630. Server 620 is operatively coupled to access switch 640. Access switch 630 and access switch 640 are operatively coupled to switch fabric 660. Switch fabric 660 is operatively coupled to access switch 690. Access switch 690 is operatively coupled to edge device 670. Edge device 670 is operatively coupled to network 650. In some embodiments, edge device 670 is a firewall, gateway, bridge, and/or other device configured to connect switch fabric 660 to network 650. In some embodiments, network 650 is outside the data center network. For example, network 650 can be the Internet, an intranet, and/or some other network or combination of networks. Thus, resources operatively coupled or connected to switch fabric 660 such as, for example, virtual resource R2 hosted on server 610 can communicate with devices (not shown) connected to network 650.

In some embodiments, edge device 670 includes a firewall module configured to limit access to switch fabric 660 from network 650. For example, edge device 670 can prevent certain internet protocol ("IP") addresses from accessing switch fabric 660, and/or prevent access to certain transport control packet ("TCP") ports on server 610, server 620, access switch 630, and/or access switch 640.

Server 610 includes virtual resource R1, virtual resource R2, and virtual switch module VS1. Server 620 includes virtual resource R3, virtual resource R4, and virtual switch module VS2. Access switch 630 includes memory 631, and access switch 640 includes memory 641. In some embodiments, memory 631 and memory 641 include a library of configuration templates. Each configuration template in the library of configuration templates includes a configuration template identifier and provisioning instructions or commands. The provisioning instructions or commands can be interpreted or used by access switch 630 and/or access switch 640 to provision one or more of access switch 630, access switch 640, server 610, virtual switch module VS1, server 620, and virtual switch module VS2 after a migration of virtual resource R1, virtual resource R2, virtual resource R3, and/or virtual resource R4. In some embodiments, memory 631 and memory 641 can be a shared memory between access switch 630 and access switch 640. For example, a database can include the library of configuration templates and be accessible to both access switch 630 and access switch 640.

FIG. 7 is a textual representation of configuration template, according to an embodiment. As illustrated in FIG. 7, a configuration template can includes one or more terms such as, for example term T1 and term T2. Each term can include an configuration template identifier (represented as "ID" in terms T1 and T2). In some embodiments, configuration templates and/or configuration template terms can include network parameters, rules, and/or limitations. For example, as illustrated in FIG. 7, a configuration template or a term of a configuration template can include a virtual local area network ("VLAN") identifier. Additionally, a configuration template or configuration template term can include an access control list ("ACL") including parameters such as VLAN, one or more ports such as TCP/IP ports, source and/or destination IP addresses (not shown), a time to live ("TTL") parameter (not shown), a packet type identifier (not shown), a protocol identifier (not shown) and/or other rules.

A configuration template can be applied to a port of a network device and/or to a virtual switch module and the network device and/or virtual switch module can route data packets or other network communication based on the configuration template. For example, a virtual switch module can drop (or discard or not forward) data packets that do not match parameters of an ACL included in a term of a configuration template. In some embodiments, a virtual switch module can forward data that include a VLAN identifier or tag that is included in a configuration template. In some embodiments, a configuration template can include a flag to indicate whether a parameter of an ACL is used to drop or to forward data packets. In other words, in some embodiments, some parameters or rules in a configuration template are exclusive rules (e.g., when matched by a portion of a data packet the data packet is dropped), and other parameters or rules in the configuration template are inclusive (e.g., when matched by a portion of a data packet, the data packet is forwarded).

In some embodiments, the parameters of a configuration template are provisioning instructions. For example, a VLAN parameter can be interpreted by a network device as an instruction to change a VLAN setting of the port of the network device operatively coupled to a virtual resource. The VLAN setting of the port can be set to a value included in a VLAN parameter of a configuration template related to the device identifier of the virtual resource. Similarly, the other parameters of a configuration template can be provisioning instructions. In some embodiments, a configuration template can include executable code (not shown in FIG. 7), and a network device can execute the executable code as a provisioning instruction.

Referring now to FIG. 6, in some embodiments virtual resources are configured to provide a device identifier to an access to which the server hosting the virtual resources are connected. For example, virtual resource R1 can send a broadcast data packet when virtual resource R1 is instantiated on or migrated to server 610 that is received by access switch 630. Access switch 630 can use the device identifier to select a configuration template from a library of configuration templates, and provision a port (or virtual port) of access switch 630 that is operatively coupled to virtual resource R1. In some embodiments, access switch 630 can query server 610 for device identifiers of virtual resources hosted by server 610 via a protocol. In some embodiments, access switch 630 can detect a virtual resource and a device identifier of a virtual resource based on network communication between virtual resource R1 and another device operatively coupled to, for example, network 650.

Figure 8:
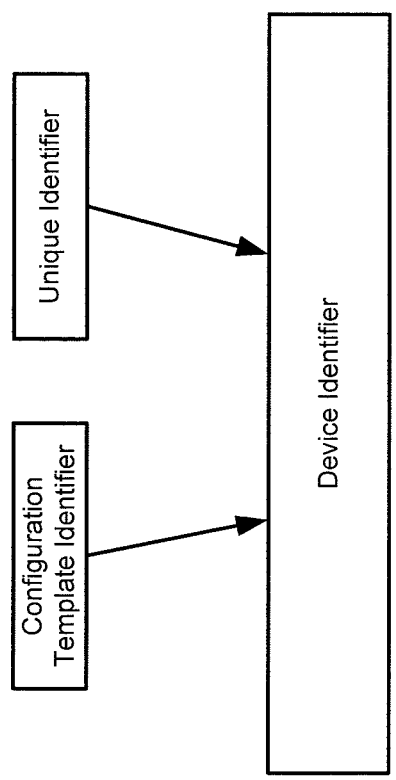
FIG. 8 is a block diagram of a device identifier, according to an embodiment.

FIG. 8 is a block diagram of a device identifier, according to an embodiment. As illustrated in FIG. 8, a device identifier can be a composite of a configuration template identifier and a unique identifier. A device identifier can be used to uniquely identify a resource such as a virtual device identifier within a network or a segment of a network. For example, a device identifier of a virtual resource such as a medium access control ("MAC") address of a virtual machine can be a composite of a configuration template identifier of a configuration template related to the virtual machine and a unique identifier. In some embodiments, a configuration template can be related to more than one resource or virtual resource. Thus, a given configuration template identifier can be part of more than one device identifier. A unique identifier (or a semi-unique identifier) can be any identifier such as, for example, a number that is used to uniquely (within a network or portion of a network) identify a virtual resource (or a physical resource such as a server). Because the unique identifier is generally unique, the device identifier can be unique despite the possibility that the portion of the device identifier representing the configuration template identifier may be identical to that portion of another device identifier.

In some embodiments, a device identifier includes multiple portions such as, for example, a portion containing the configuration template identifier and another portion including the unique identifier. For example, a device identifier can be represented by a bit vector of forty eight bits. Twelve bits can represent a number that is the configuration template identifier and the remaining thirty six bits can be a unique identifier such that the resource associated with the device identifier is uniquely identified by the device identifier based on the unique identifier. In other words, the device identifier can be a concatenation of a configuration template identifier and a unique identifier.

Figure 9:
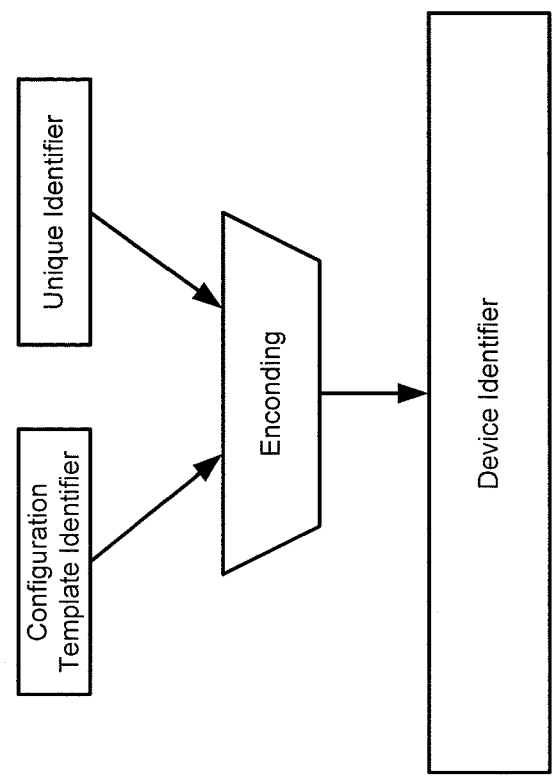
FIG. 9 is a block diagram of another device identifier, according to another embodiment.

In some embodiments, a device identifier can be produced based on a transform or encoding of a configuration template and a unique identifier. FIG. 9 is a block diagram of another device identifier, according to another embodiment. Similar to FIG. 8, FIG. 9 illustrates a device identifier based on a configuration template identifier and a unique identifier. As illustrated in FIG. 9, a configuration template and a unique identifier can be encoded (or transformed) to produce a device identifier. For example, a configuration template identifier can be represented by a bit vector (or bit string), and a unique identifier can be represented by a bit vector. The bit vectors representing the configuration template identifier and the unique identifier can be encoded together to define a device identifier. For example, a forty-eight-bit device identifier can be produced based on a twelve-bit configuration template identifier and a thirty-six-bit unique identifier by interleaving one bit of the configuration template identifier between every third bit of the unique identifier, such that each of the bits of the configuration template identifier are interleaved among the bits of the unique identifier to produce a forty-eight-bit device identifier. Such an encoding can, for example, cause the device identifier to appear more random. In some embodiments, the encoding can be configured to be progressive based on the unique identifier (e.g., positioning of bits in a vector representation of the device identifier varies with bit value in a vector representation of the unique identifier). For example, the encoding of bits from the configuration template identifier into the device identifier can be based on the value (e.g., 1 or 0) of one or more bits in the unique identifier. In other embodiments, some other encoding is used.

In some embodiments, the encoding can be reversed such that the configuration template identifier can be determined based on the device identifier. Thus, the configuration template identifier of the configuration template associated with the virtual resource identified by the device identifier can be extracted from the device identifier. In some embodiments, a bit mask can be used extract a configuration template identifier from a device identifier. In some embodiments, a bit mask and logical operations such as, for example, bit shifts, an AND operation, and/or an OR operation can be used to extract a configuration template identifier from a device identifier.

In some embodiments, a system or network administrator can use a software application to produce a device identifier for each virtual resource that will be available in a network such as in a data center network. Such a software application can be configured to have access to configuration parameters of the virtual resources such that the software application can update a parameter of each virtual resource including the device identifier of that virtual resource. In other words, the software application can associate a device identifier with a virtual resource by updating a parameter of the virtual resource. For example, a software application can have access via a network or a local file system to data files including configuration parameters of virtual machines. The software application can produce or generate device identifiers for the virtual machines based on a configuration template identifier of a configuration template related to each virtual machine and a unique identifier. After generating a device identifier, the software application can store the device identifier as a parameter of the virtual machine such that the virtual machine can be identified by the device identifier after the virtual machine has been instantiated on a host device such as a server.

In some embodiments, the system or network administrator can also provide the software application with commands or instructions configured to cause the software application to relate a configuration template with a virtual machine. In some embodiments, the software application can provide a graphical user interface ("GUI") or command line interface ("CLI") for providing such commands. In some embodiments, a data file such as a script file including such commands can be provided to the software application.

In some embodiments, virtual machines or virtual resources can be identified by the software application based on a file name of a configuration file or a name of the virtual machine. In some embodiments, virtual machines or virtual resources can be identified by the software application based on a type of the virtual resource or a service provided by the virtual resource. In some embodiments, the type of the virtual resource or an identifier of a service provided by the virtual resource can be included in a configuration file accessible to the software application.

In some embodiments, the unique identifier can be generated at random by the software application (e.g., a unique identifier can be a nonce). In some embodiments, the unique identifier is input to the software application by a system or network administrator.

As illustrated in FIG. 6, external management entity 680 can be operatively coupled to access switch 630, access switch 640, and access switch 690 to send commands via access switch 630 and access switch 640 to server 610 and server 620, respectively. Access switch 630 and access switch 640 can provide various interfaces such as command interfaces to enable external management entity 680 to communicate with access switch 630 and access switch 640. In some embodiments, external management entity 680 can provide instructions or commands to virtual resources hosted on server 610 and server 620. In some embodiments, external management entity 680 can be configured to send commands to server 610 and/or server 620 to initiate or direct migration and/or instantiation of virtual resources. In some embodiments, external management entity 680 can provide configuration templates to network resources such as, for example, access switches 630 and 640. For example, external management entity 680 can update a database including a library of configuration templates that is accessible to access switches 630 and 640.

In some embodiments, access switch 630 and access switch 640 can communicate via a proprietary protocol with external management entity 680. In some embodiment, communication between external management entity 680 and access switch 630 and/or access switch 640 is encrypted or secured using an encryption scheme such as, for example, symmetric encryption, public/private key encryption, and/or digital certificates. In some embodiments, external management entity 680 can send provisioning instructions or commands to server 610 and/or server 620 through a network management module (not shown) in communication with access switch 630, access switch 640, server 610, and/or server 620 via an application programming interface ("API"). More details related to network management module and external management entities are set forth in co-pending U.S. patent application Ser. No. 12/346,623, filed on Dec. 30, 2008, and entitled "Method and Apparatus for Determining a Network Topology during Network Provisioning," which is incorporated herein by reference in its entirety.

In some embodiments, external management entity 680 is in communication with server 610 and server 620 via a control plane of switch fabric 660. In other words, external management entity 680 can be directly coupled to access switch 630 and/or or access switch 640 and provide commands to server 610 and server 620 through access switch 630 and access switch 640, respectively. In some embodiments, external management entity 680 can be in communication with switch fabric 660 and provide commands to server 610 and server 620 via switch fabric 660. In some embodiments, external management entity can be connected to network 650 and provide commands to server 610 and 620 via network 650. In some embodiments (not shown in FIG. 6), external management entity 680 can be directly connected to access switch 630, access switch 640, server 610, and server 620. In some embodiments, access switch 630, access switch 640, server 610, server 620, and/or external management entity 680 can be operatively coupled to and configured to communication via a network (not shown)s separate from network 650. For example, access switch 630, access switch 640, server 610, server 620, and/or external management entity 680 can be operatively coupled to a management network (not shown).

In some embodiments, external management entity 680 is configured to provide instructions to server 610 and server 620 related to migration, instantiation, and removal of virtual resources. For example, external management entity 680 can provide instructions to servers 610 and 620 based on server utilization, network bandwidth, maintenance schedule or needs, and/or other factors. In some embodiments, external management entity 680 sends instructions to virtual resources R1 and R2 hosted on server 610 and virtual resources R3 and R4 hosted on server 620. Access switch 630 is configured to provision access switch 630, server 610, and/or virtual switch module VS1 after server 610 and/or server 620 have responded to the instructions from external management entity 680. Access switch 640 is configured to provision access switch 640, server 620, and/or virtual switch module VS2 after server 610 and/or server 620 have responded to the instructions from external management entity. In some embodiments, external management entity 680 can manage start, stop, halt, pause, and/or migration of virtual resources, and access switch 630 and access switch 640 can provision resources in the network after start, stop, halt, pause, and/or migration of one or more virtual resources. Thus, provisioning in the network can be distributed across access switches in the system and dynamic in response to changes in the topology of virtual resources in the network.

In some embodiments, access switches 630 and 640 can be configured to communicate with servers 610 and 620 and/or other devices (e.g., storage servers, database servers, and/or other computer servers) via a protocol such as Ethernet, and with switch fabric 660 (or, core of a switch fabric) via another protocol (e.g., a cell-based protocol or other protocol other than Ethernet). In other words, access switches 630 and 640 can provide host devices 610 and 620, respectively, and/or other devices configured to communicate via one protocol with access to a switch fabric configured to communication via another protocol. In some embodiments, a switch fabric can include various types or classes or switches. For example, a switch fabric can include core switches, aggregation switches, and/or access switches. More specifically, in some embodiments, a switch fabric can include a core switch operatively coupled to a group of aggregation switches, and each aggregation switch in the group of aggregation switch can be operatively coupled to a group of access switches. Each access switch can be operatively coupled to a group of servers. Thus, each server can be operatively coupled to the other servers via the switch fabric.

More specifically, for example, the core of switch fabric 660 can be configured as a strictly non-blocking network or rearrangeably non-blocking network such as a Clos network, and can include a data plane and a control plane. Thus, host devices 610 and 620 can be operatively coupled one to another via access switches 630 and 640, respectively, which are operatively coupled to switch fabric 660. For example, host device 610 can send a data packet addressed to a host device 620 via an Ethernet protocol to access switch 630. Access switch 630 can receive the data packet and send the data packet via switch fabric 660 using a proprietary protocol to access switch 640 operatively coupled to access switch 620. For example, access switch 630 can send the data packet to access switch 640 by separating or segmenting the data packet into cells that are transported via switch fabric 660 (configured, for example as a cell-based switch fabric) based on data signals in a data plane and control signals in a control plane of switch fabric 660. Alternatively, in some embodiments switch fabric 660 can segment the data packet prior to transporting it to access switch 640. Access switch 640 can then receive the cells representing the segmented data packet, reassemble the data packet, and send the data packet to host device 620 via an Ethernet protocol. Alternatively, switch fabric 660 can reassemble the data packet based on the cells representing the data packet prior to providing the data packet to access switch 640.

Said differently, in some embodiments, access switches 630 and 640 can be configured to function as gateway devices between switch fabric 660, host devices 610 and 620, and/or other devices, which can be configured to communicate based on different protocols. As described above, a server can be configured to communicate based on an Ethernet protocol and a switch fabric can be a cell-based fabric where one or more portions of data (e.g., data packets) are transmitted via the switch fabric in one or more cells (e.g., variable size cells, fixed size cells). In other words, access switches 630 and/or 640 can provide servers 610 and/or 620 and/or other devices configured to communicate via one protocol with access to switch fabric 660, which can be configured to communicate via another protocol. In some embodiments, access switch 630 and/or access switch 640 can be configured to function as a router, a network hub device, and/or a network bridge device.

Additionally, in some embodiments, access switch 630 and/or access switch 640 can be configured to function as a gateway device for multiple host devices (or servers). Specifically, routing functionality between virtual resources at multiple host devices can be performed at a network device such as access switch 630 and/or access switch 640. This capability can facilitate scaling of host devices configured to access, for example, a switch fabric via a network device in a desirable fashion. More details related to switch fabrics and control planes of switch fabrics are set forth in co-pending patent application U.S. patent application Ser. No. 12/345, 498, filed on Dec. 29, 2008, and entitled "Control Plane Architecture for Switch Fabrics," which is incorporated herein by reference in its entirety.

Figure 10:
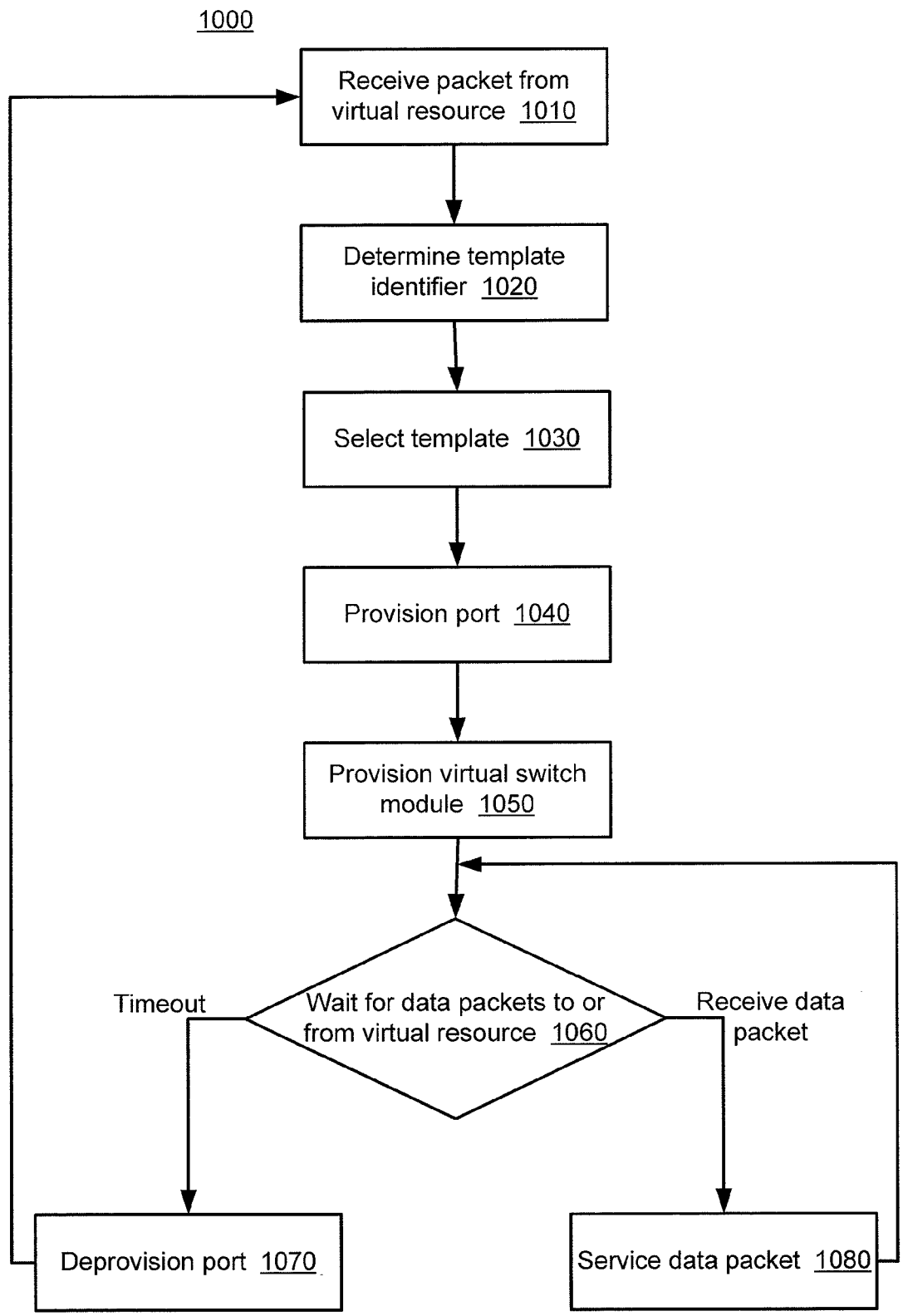
FIG. 10 is a block diagram of a process for provisioning for a virtual resource in a network based on observation of data packets, according to an embodiment.

FIG. 10 is a block diagram of process 1000 for provisioning for a virtual resource in a network based on observation of data packets, according to an embodiment. A data packet is received from a virtual resource, at 1010. In some embodiments, the data packet can be a broadcast data packet that is sent by a virtual resource upon instantiation, migration, halt, suspend, or another virtual resource state. In other embodiments, the data packet can be a data packet addressed to another device. For example, a virtual resource can resume communication with another device after being migrated from one host device to another, and the network resource can detect the presence of the virtual resource based on data packets sent to or from other devices. In some embodiments, such a method or process can be referred to as data-triggered, for example, because provisioning is triggered based on data sent to or from a virtual resource. The virtual resource can be, for example, similar to R1 shown in FIG. 6. In some embodiments, the data packet is sent to a network device (e.g., access switch 630 in FIG. 6) configured to provision a virtual resource based on the data packet. In some embodiments, the data packet is a broadcast packet sent by the virtual resource to broadcast a service provided by the virtual resource. For example, a virtual resource can be a file server and the virtual resource can broadcast or publish information about data volumes available via the virtual resource in the data packet. In some embodiments, a device identifier can be a medium access control ("MAC") address of a device such as a virtual resource. In some embodiments, a device identifier can be some other identifier such as, for example, a device name, a globally unique identifier ("GUID"), or a universally unique identifier ("UUID") known to a host device and a network device and used to identify a virtual resource.

After the data packet is received, a configuration template identifier is determined, at 1020. In some embodiments, the data packet includes an identifier of the virtual resource or a service provided by the virtual resource that can be used to select a configuration template including provisioning parameters or instructions. For example, the data packet can include a device identifier of the virtual resource, a virtual local area network ("VLAN") identifier of a VLAN to which the virtual resource and/or service is related, or a service identifier of a service provided by the virtual resource. In some embodiments, such an identifier is used to determine a configuration template associated with or related to the service or virtual resource. For example, a table or database can include a device identifier of a virtual resource and a configuration template identifier associated with that resource.

In some embodiments, a configuration template identifier can be embedded within a device or service identifier. For example, as discussed above in relation to FIGS. 8 and 9, a configuration template identifier can be embedded within a MAC address or other device identifier of a virtual resource. In some embodiments, the device identifier has a first portion that represents a unique value such as, for example, a unique identifier to uniquely identify the virtual resource in the network or a network segment, and a second portion that represents the configuration template identifier. In some embodiments, a device identifier is a 48-bit value and the least significant (or lower) 32 bits are used to uniquely identify the virtual resource and the most significant (or higher) 16 bits are used to represent a configuration template identifier. For example, a hexadecimal representation of such a device identifier can be 0x00FA8391DE1B. The lower 32 bits can be masked (e.g., logically combined based on a logical AND operation with a hexadecimal value of 0xFFFF00000000) and the resulting value right bit-shifted 32 bits to extract the configuration template identifier of 0x00FA (or, 250 as a decimal representation).

In some embodiments, a configuration template identifier can be extracted from a device identifier based on other operations. For example, as illustrated in FIG. 9, a device identifier can be defined based on a transform (e.g., mathematical operation) that is reversible such that the configuration template identifier can be determined based on the device identifier and, for example, an inverse of the transform. In some embodiments, a configuration template identifier can be extracted from or defined by a device identifier using an inverse or reverse of other methods discussed above in relation to FIGS. 8 and 9, and/or other transforms or combinations.

At 1030, a configuration template identifier can be used to select a configuration template from a library of configuration templates. In other words, a configuration template identifier can be used to determine an appropriate configuration template for a virtual resource or a service provided by a virtual resource. For example, a configuration template identifier can be an index into table, database, or library of configuration templates. The configuration template can include the provisioning parameters, instructions, and/or commands that are interpreted or sent to provision network resources.

Based on the configuration template selected, at 1030, resources can be provisioned, at 1040 and 1050. In some embodiments, at 1040, one or more network ports can be provisioned. For example, a port of a network device such as an access switch to which a host device hosting a virtual resource is connected can be provisioned based on a configuration template. Rules and/or ACLs, for example, can be applied to the port such that data packets received by the access switch that do not satisfy the rules and/or ACLs are not forwarded to the host device or virtual resource. Such rules and/or ACLs can be based on IP addresses, TCP ports, authentication credentials, and/or bandwidth limitations. In some embodiments, process 1000 is implemented on a network device (e.g., an access switch), and the network device provisions ports on the network device. In other words, the network device can provision its own ports.

In some embodiments, at 1050, a virtual switch module hosted by a host device and in communication with the virtual resource can be provisioned. Similar to ports on a network device, a virtual switch module can have virtual ports to which virtual resources are operationally coupled. Such virtual resources are logically coupled rather than physically coupled to a virtual switch module via virtual ports. In other words, in some embodiments, virtual ports via which virtual resources are coupled to a virtual switch are realized or implemented in a memory of a network device by a processor in communication with the memory. Because more than one virtual resource can be operatively coupled to a virtual network switch, and rules and/or ACLs are applicable to virtual resource, virtual switch modules can be provisioned similar to ports of a network device.

In some embodiments, a network device can provision a host device or a virtual switch module hosted by a host device by pushing a portion of a configuration template such as, for example, a provisioning instruction to the host device or virtual switch module. The virtual switch module can interpret the provisioning instruction and apply the necessary provisioning (e.g., rules and ACLs) based on the configuration template. In some embodiments, a network device can provide or send commands or instructions to the host device to provision a virtual switch module. In other words, in some embodiments, a virtual switch module can be provisioned based on commands provided by a network device.

A provisioning instruction can be code or other commands such as, for example, a script that can be interpreted by a network device and/or other device to configure a device in the network. For example, a provisioning instruction can specify an ACL or a rule that is to be applied to a port of a network device, or that a virtual port connection is to be defined between a virtual resource and a virtual switch module. In some embodiments, a provisioning instruction can be an instruction to a virtual machine to change an operational state. For example, an instruction or command to the virtual machine to shut down, suspend, or restart.

In some embodiments, a port, at 1040, and/or a virtual switch module, at 1050, are provisioned similarly. In other words, the same provisioning such as rules and/or ACLs, for example, can be applied to a virtual switch module as are applied to a port of a network device. In some embodiments, a port and a virtual switch module are provisioned complimentarily. Said differently, a configuration template can include one set of provisioning instructions for a port of network device and another set of provisioning instructions for a virtual switch module. In other embodiments, a port and a virtual switch are provisioned with some similar provisioning instructions and some complimentary provisioning instructions. More details related to cooperative provisioning and/or operation of virtual switch modules and network devices are set forth in co-pending U.S. patent application Ser. No. 12/346,608, filed on Dec. 30, 2008, and entitled "Methods and Apparatus Related to Data Transmissions between Virtual Resources via a Network Device;" co-pending U.S. patent application Ser. No. 12/346,612, filed on Dec. 30, 2008, and entitled "Methods and Apparatus Related to Data Transmissions between Virtual Resources via a Network Device;" co-pending U.S. patent application Ser. No. 12/346,615, filed on Dec. 30, 2008, and entitled "Methods and Apparatus For Routing between Virtual Resources based on a Routing Location Policy;" co-pending U.S. patent application Ser. No. 12/346,618, filed on Dec. 30, 2008, and entitled "Methods and Apparatus for Provisioning at a Network Device in Response to a Virtual Resource Migration Notification;" and co-pending U.S. application Ser. No. 12/346,625, filed on Dec. 30, 2008, and entitled "Methods and Apparatus Related to Managing Communications Between Virtual Resources;" all of which are incorporated herein by reference in their entireties. In some embodiments, a virtual switch module (or virtual switch) can be configured as a multiplexer and/or demultiplexer and switching (or routing) can take place or occur at a network device.

After the port and/or the virtual switch module are provisioned, the virtual resource can communicate with other devices. In some embodiments, a virtual resource can communicate with other virtual resources connected to a common access switches via the common access switch. In some embodiments, a virtual resource can communicate with other virtual resources or devices coupled to a common access switch or other access switch via a switch fabric such as a multi-stage switch fabric to which each of the access switches is coupled. In some embodiments, a virtual resource can communicate with devices and/or virtual resources connected to a network to which that virtual resource is coupled via an access switch, switch fabric, and/or edge device.

At 1060, process 1000 waits for data packets to or from the virtual resource. If a data packet is received, the data packet is serviced, at 1080. A data packet can be serviced by applying the rules and/or ACLs provisioned at the port and/or virtual switch module to the data packet. In other words, the data packet is filtered or categorized based on data in the data packets. Further, after rules and/or ACLs are applied to a data packet, the data packet can be sent or forwarded to the virtual resource (if so addressed) or sent of forwarded to another device via, for example, a switch fabric or a network. After the data packet has been serviced, process 1000 can return to step 1060.

If a data packet is not received within a timeout period, a network device can determine that the virtual resource (or physical resource such as a server or other host device) is no longer in communication with the port. For example, the virtual resource could have halted, suspended, crashed, migrated, and/or had some other change in state. After a time out is detected, the provisioning of steps 1040 and 1050 can be reversed or changed (e.g., the virtual resource is deprovisioned), at 1070. For example, a rule added or applied to a virtual switch module during step 1050 can be removed after the timeout period. In some embodiments, the configuration template determined at step 1030 can be interpreted to determine what deprovisioning is appropriate, at 1070. After deprovisioning at 1070, process 1000 can return to step 1010.

In some embodiments, a network device can concurrently implement multiple processes 1000. For example, an access switch can manage or implement an instance of process 1000 for each virtual resource detected by the access switch. In some embodiments, process 1000 can include additional steps and/or fewer steps than illustrated in FIG. 10. For example, in some embodiments, a network device is not provisioned based on a configuration template. In some embodiments, a single process 1000 (or instance of process 1000) is implemented on a network device for all the virtual resources detected by the network device. Accordingly, process 1000 can include additional steps for managing the state of each virtual resource detected by the network device. For example, after deprovisioning a port and/or a virtual switch module after a timeout, process 1000 can include additional steps to determine whether additional virtual resource have already been detected and provisioned by that network device, and return to step 1060 to wait for data packets to or from already detected and provisioned virtual resources. In other embodiments, deprovisioning can be based on a notification or command sent from an external management entity, a host device (or hypervisor or other software module executing at the host device), and/or from some other device. For example, a notification that virtual resource will be migrated, suspended, and/or change an operational state.

In some embodiments, process 1000 can include additional steps to receive and respond or react to state or status changes of a virtual resource based on, for example, information provided by that virtual resource and/or a host device at which that virtual resource is running. For example, a virtual resource can provide a migration, suspend, or halt notification to a network device implementing process 1000. The network device can, for example, deprovision a virtual switch module and/or port based on the notification and/or configuration template related to the virtual resource. In some embodiments, a virtual switch module is not provisioned. In some embodiments, a port of a network device is not provisioned.

In some embodiments, a virtual resource can coordinate migration of the virtual resource with one or more network devices. For example, a virtual resource can provide a migration notification to a first network device including an identifier of a host device to which the virtual resource will migrate. In response to such a notification, the first network device can deprovision a port and/or virtual switch module. Additionally, the first network device provide a notification to a second network device (e.g., via a switch fabric to the network device connected to the host device to which the virtual resource will migrate) indicating that the virtual resource will migrate to the second host device. The second network device can receive the notification and provision resources (e.g., a port of the network device and/or a virtual switch module) based on information included in the notification. Thus, network devices and virtual resources can preprovision ports, virtual switch modules, and/or other resources in a network to decrease interruptions of service as a virtual resource migrates from one host device to another. In some embodiments, the notification can include additional information such as, for example, an identifier of the virtual resource or a service provided by the virtual resource, an identifier of the host device from which the virtual resource will migrate, and/or other information associated with the migration or provisioning.

Figure 11:
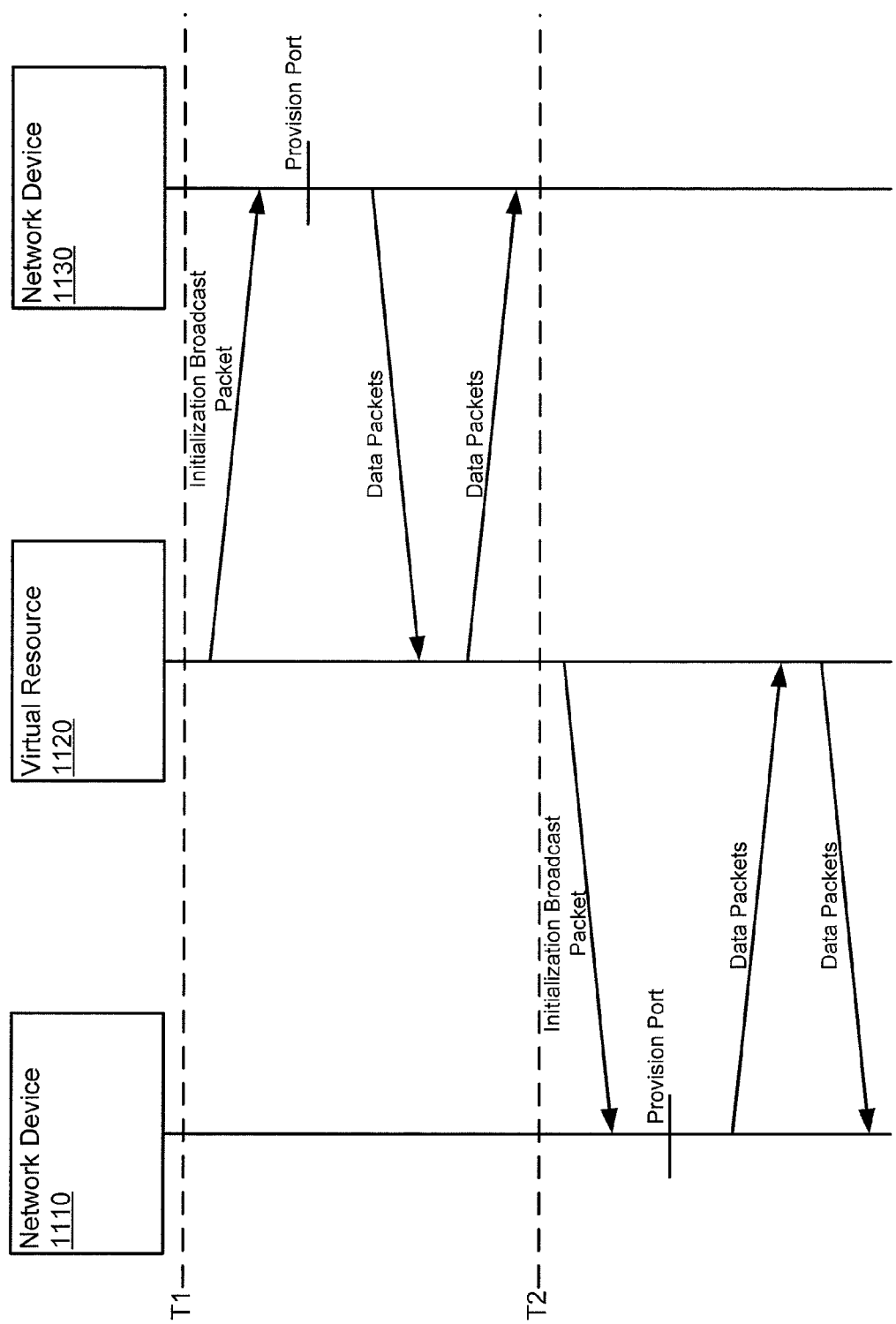
FIG. 11 illustrates communication flow in a system for provisioning for a migrating virtual resource in a network, according to an embodiment.

FIG. 11 illustrates communication flow in a system for provisioning for a migrating virtual resource in a network, according to an embodiment. As illustrated in FIG. 11, virtual resource 1120 can migrate from a host device operatively coupled to network device 1130 to a host device operatively coupled to network device 1110. At time T1, virtual resource 1120 is hosted by a host device operatively coupled to network device 1130. Virtual resource 1120 sends an initialization broadcast packet or data packet to network device 1130 during an initialization routine. In some embodiments, some other data packets including information about virtual resource 1120 and/or services provided by virtual resource 1120 are broadcast or sent to network device 1130 and/or other devices.

In some embodiments, devices in a network (or operatively coupled one to another) such as host device, network device, virtual resources, and/or an external management entity can cooperate during migration of a virtual resource such that provisioning of a network device is complete before the virtual resource is migrated or instantiated on a host device operatively coupled to that network device. In some embodiments, device in a network can similarly cooperate to deprovision a network device before and/or after a virtual device migrates from or is suspended on a host device operatively coupled to that network device. In some embodiments, provisioning and/or deprovisioning a network device includes provisioning and/or deprovisioning a port of the network device.

For example, when virtual resource migrates from one server to another server, it can be desirable to want to ensure that the new server and/or access switch operatively coupled to that server is provisioned for the virtual resource before migration is complete. In some embodiments, provisioning is not complete, but some coordination during provisioning exists between the server on which the virtual resource is hosted and/or the access switch to which that server is operatively coupled before the migrations. In some embodiments, such a priori or early provisioning can prevent data or traffic loss between the virtual resource and other devices. In some embodiments, an applications enabled by a virtual resource can be agnostic to or not receive any notification or indication associated with a migration. Thus, in some embodiments, access switches and/or host devices are provisioned such that a virtual resource can continue operating after migration without configuration changes at the virtual resource. For example, access switches can be provisioned such that a virtual resource has one IP address before and after a migration and can communicate with other devices based on that IP address before and after the migration.

In some embodiments, a server (or other host device) attached to an access switch (or other network device) can provide early notification to the access switch that a virtual resource will be migrated. In some embodiments, the notification is configured to cause the access switch to deprovision the access switch for the virtual resource, for example, because the virtual resource will be migrated from a server operatively coupled to that access switch. In some embodiments, the notification is configured to cause the access switch to provision the access switch for the virtual resource, for example, because the virtual resource will be migrated to a server operatively coupled to that access switch. In some embodiments, notification may come from an external management entity, a host device, a network device, and/or some other source. In some embodiments, a network device can suspend and/or resume operation of a server and/or virtual resource based on or in response to such a notification.

After receiving the initialization broadcast packet, network device 1130 provisions a port of network device 1130 operatively coupled to virtual resource 1120. In some embodiments, network device 1130 receives the data packet and provides provisioning information to virtual resource 1120, for example, as discussed in relation to process 1000. In some embodiments, provisioning information is sent to the host device on which virtual resource 1120 is hosted and/or a virtual switch module also hosted on that host device and in communication with virtual resource 1120. After the provisioning, data packets can be exchanged between virtual resource 1120, network device 1130 and other device with which network device 1130 is in communication. For example, virtual resource 1120 can be a web server and clients can access the web server via the Internet to which network device 1130 is connected via a switch fabric in a data center.

At time T2, virtual resource 1120 migrates to a host device operatively coupled to network device 1110. For example, when the host device operatively coupled to network device 1130 requires service and/or is faulty, or when a network traffic load between the host device coupled to network device 1130 and the host device coupled to network device 1110 is desired, the virtual resource 1120 can migrate to the host device operatively coupled to network device 1110. Virtual resource 1120 sends an initialization broadcast packet or data packet to network device 1110 during an initialization routine after being migrated to the host device coupled to network device 1110. In some embodiments, some other data packets including information about virtual resource 1120 and/or services provided by virtual resource 1120 is broadcast or sent to network device 1110 and/or other devices.

Network device 1110 receives the data packet and provisions a port of network device 1110 operatively coupled to virtual resource 1120. In some embodiments, network device 1110 provides provisioning information to virtual resource 1120, for example, as discussed in relation to process 1000. In some embodiments, provisioning information is sent to the host device on which virtual resource 1120 is hosted and/or a virtual switch module also hosted on that host device and in communication with virtual resource 1120. After virtual resource 1120 (or the host device or virtual switch module) is provisioned, data packets can be exchanged between virtual resource 1120, network device 1110 and other device with which network device 1110 is in communication.

Figure 12:
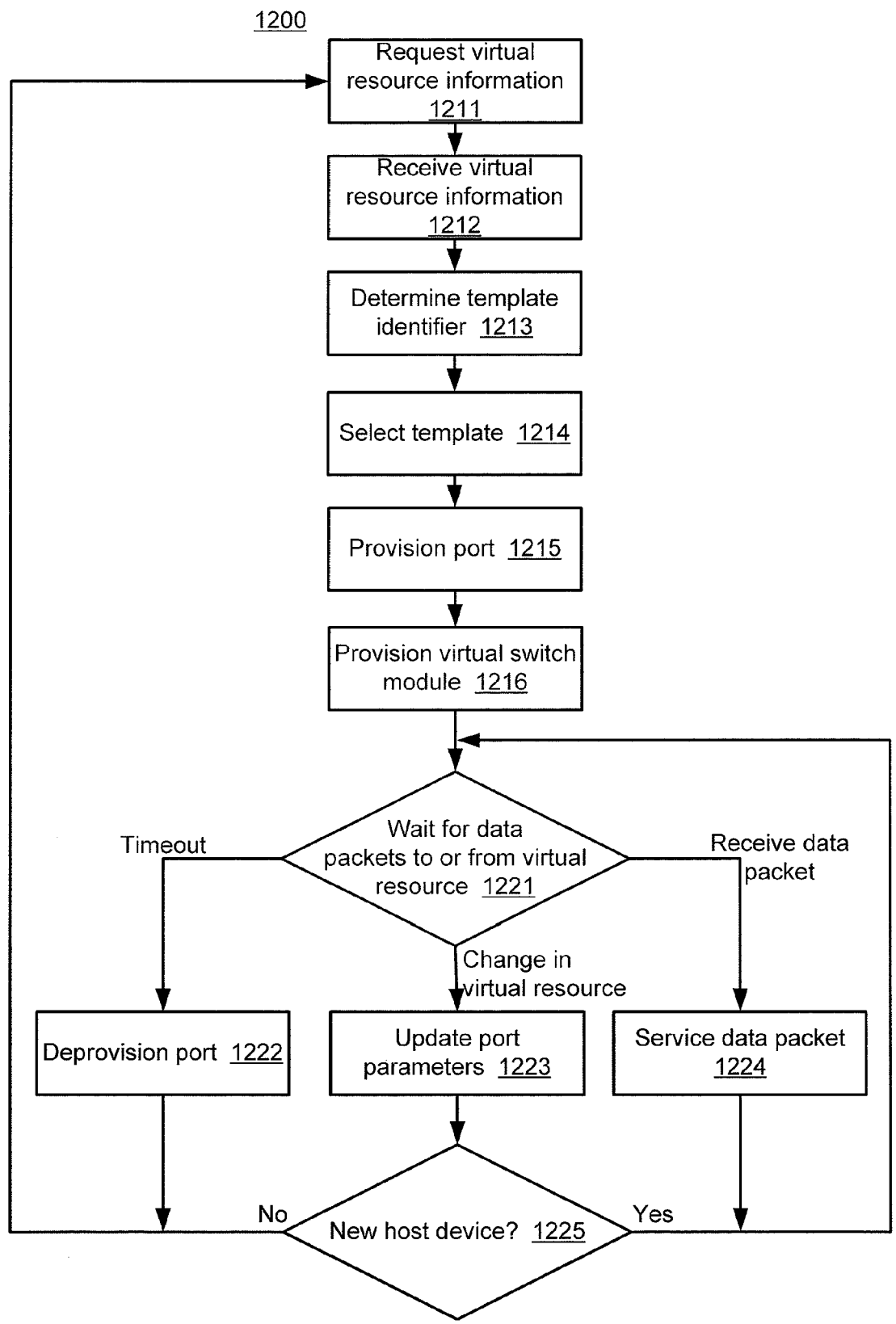
FIG. 12 is a block diagram of a process for provisioning for a virtual resource in a network based on a discovery protocol, according to an embodiment.

FIG. 12 is a block diagram of process 1200 for provisioning for a virtual resource in a network based on a discovery protocol, according to an embodiment. A request for information about virtual resources is sent, at 1211. In some embodiments, a network device sends the request for information about virtual resources hosted by a host device to the host device. In some embodiments, the network device can query the host device about any unprovisioned virtual resources or virtual resources for which the host device has not received provisioning instructions. In some embodiments, the network device can request an identifier of each virtual resource hosted by a host device. In some embodiments, a network device can request an identifier associated with or related to a service provided by each virtual resource hosted by the host device. In some embodiments, a network device can request a status or state of each virtual resource or a service provided by each virtual resource hosted by the host device. For example, an access switch can request information about virtual resources after restarting (for example, resulting in loss of information related to the virtual resources in a volatile memory) to avoid detecting virtual resources based on data-triggered methods such as, for example, methods described in relation to FIG. 10.

A host device can provide the requested information related to virtual machines hosted by the host device to the network device, at 1212. The network device can parse and/or interpret the information provided by the host device to determine how to provision the resources. In some embodiments, step 1211 and step 1212 are described in a protocol implemented by a network device and host device for exchange of information related to virtual resources. In some embodiments, communication between the host device and network device based on the protocol are encrypted and/or otherwise secured.

In some embodiments, the information received at the network device from the host device includes identifiers of virtual resources and/or a service provided by virtual resources that can be used to select a configuration template including provisioning parameters or instructions. For example, the information related to the virtual resources hosted by the host device can include a device identifier of each virtual resource, a VLAN identifier of a VLAN to which a virtual resource and/or a service is related, or a service identifier of a service provided by a virtual resource. In some embodiments, such an identifier is used to determine a configuration template associated with or related to each service or virtual resource. For example, a table or database can include a device identifier of a virtual resource and a configuration template identifier associated with that resource.

In some embodiments, a configuration template identifier can be embedded within a device or service identifier. For example, as discussed above in relation to FIGS. 8 and 9, a configuration template identifier can be embedded within a MAC address or other device identifier of a virtual resource. In some embodiments, the device identifier has a first portion that represents a unique value such as, for example, a unique identifier to uniquely identify the virtual resource in the network or a network segment, and a second portion that represents the configuration template identifier. In some embodiments, a device identifier is a 48-bit value and the least significant (or lower) 32 bits are used to uniquely identify the virtual resource and the most significant (or higher) 16 bits are used to represent a configuration template identifier. More specifically, for example, a hexadecimal representation of such a device identifier can be 0x00FA8391DE1B. The lower 32 bits can be masked (e.g., logically combined based on a logical AND operation with a hexadecimal value of 0XFFFF00000000) and the resulting value right bit-shifted 32 bits to extract the configuration template identifier of 0x00FA (or, 250 as a decimal representation).

In some embodiments, a configuration template identifier can be extracted from a device identifier based on other operations. For example, as illustrated in FIG. 9, a device identifier can be defined based on a transform (e.g., mathematical operation) that is reversible such that the configuration template identifier can be determined based on the device identifier and, for example, an inverse of the transform. In some embodiments, a configuration template identifier can be extracted from or defined by a device identifier using an inverse or reverse of other methods discussed above in relation to FIGS. 8 and 9, and/or other transforms or combinations.

At 1214, a configuration template identifier can be used to select a configuration template from a library of configuration templates. In other words, a configuration template identifier can be used to determine an appropriate configuration template for each virtual resource hosted by the host device. For example, a configuration template identifier can be an index into table, database, or library of configuration templates. The configuration template can include the provisioning parameters, instructions, and/or commands that are interpreted or sent to provision network resources.

In some embodiments, a configuration template identifier can be included in the information related to the virtual devices hosted by the host device (requested in 1211 and 1212). For example, based on the protocol between the host device and the network device, a configuration template identifier can be provided to the network device with the identifier of each virtual resource related to or associated with that configuration template identifier. Configuration templates can then be selected based on the configuration template identifiers provided by the host device. In other embodiments, configuration templates can be provided by the host device to the network device. In other words, the host device or, for example, a virtual switch module hosted by the host device or a virtual resource can provide configuration templates to a network device. Additionally, an identifier of each virtual resource related to the configuration template can be provided to the network device with the configuration template.

Based on the configuration template selected or provided, resources can be provisioned, at 1215 and 1216, for each virtual resource. In some embodiments, at 1215, one or more network ports can be provisioned. For example, a port of a network device such as an access switch to which a host device hosting a virtual resource is connected can be provisioned based on a configuration template. Rules and/or ACLs, for example, can be applied to the port such that data packets received by the access switch that do not satisfy the rules and/or ACLs are not forwarded to the host device or virtual resource. Such rules and/or ACLs can be based on IP addresses, TCP ports, authentication credentials, and/or bandwidth limitations. In some embodiments, process 1200 is implemented on a network device, and the network device provisions ports on the network device. In other words, the network device can provision its own ports.

In some embodiments, at 1216, a virtual switch module hosted by a host device and in communication with the virtual resource can be provisioned. Similar to ports on a network device, a virtual switch module can have virtual ports to which virtual resources are operatively coupled. In some embodiments, a network device can provision a host device or a virtual switch module hosted by a host device by pushing a portion a configuration template to the host device or virtual switch module. The virtual switch module can interpret the configuration template and apply the necessary provisioning (e.g., rules and ACLs) based on the configuration template. In some embodiments, a network device can provide or send commands or instructions to the host device to provision a virtual switch module. In other words, in some embodiments, a virtual switch module can be provisioned based on commands provided by a network device.

In some embodiments, a port, at 1215, and a virtual switch module, at 1216, are provisioned similarly. In other words, the same provisioning such as rules and/or ACLs, for example, can be applied to a virtual switch module as are applied to a port of a network device. In some embodiments, at port and a virtual switch module are provisioned complimentarily. Said differently, a configuration template can include one set of provisioning instructions for a port of network device and another set of provisioning instructions for a virtual switch module. In other embodiments, a port and a virtual switch are provisioned with some similar provisioning instructions and some complimentary provisioning instructions. More details related to cooperative provisioning and/or operation of virtual switch modules and network devices are set forth in co-pending U.S. patent application Ser. No. 12/346,608, filed on Dec. 30, 2008, and entitled "Methods and Apparatus Related to Data Transmissions between Virtual Resources via a Network Device," which is incorporated herein by reference in its entirety.

After the port and/or the virtual switch module is provisioned, the virtual resource can communicate with other devices. In some embodiments, a virtual resource can communicate with other virtual resources connected to a common access switch via the access switch. In some embodiments, a virtual resource can communicate with other virtual resources or devices coupled to a common access switch or other access switches via a switch fabric such as a multi-stage switch fabric to which each of the access switches are coupled. In some embodiments, a virtual resource can communicate with devices and/or virtual resources connected to a network to which that virtual resource is coupled via an access switch, switch fabric, and/or edge device.

At 1221, process 1200 waits for data packets to or from the virtual resource. If a data packet is received, the data packet is serviced, at 1224. A data packet can be serviced by applying the rules and/or ACLs provisioned at the port and/or virtual switch module to the data packet. In other words, the data packet is filtered or categorized based on data in the data packets. Further, after rules and/or ACLs are applied to a data packet, the data packet can be sent or forwarded to the virtual resource (if so addressed) or sent of forwarded to another device via, for example, a switch fabric or a network. After the data packet has been serviced, process 1200 can return to step 1221.

If a data packet is not received within a timeout period, a network device can determine that the virtual resource is no longer in communication with the port. For example, the virtual resource could have halted, suspended, crashed, migrated, and/or had some other change in state. After a time out is detected, the provisioning of steps 1215 and 1216 can be reversed or changed (e.g., the virtual resource is deprovisioned), at 1222. For example, a rule added or applied to a virtual switch module during step 1216 can be removed after the timeout period. In some embodiments, the configuration template determined or received can be interpreted to determine what deprovisioning is appropriate, at 1222. After deprovisioning at 1222, process 1200 can return to step 1211.

At 1221, a network device can receive information from a host device related to a change in a state or status of a virtual resource. For example, a change in the state or status (e.g., running, suspended, stopped, or migrating) of a virtual resource can be provided by the virtual resource or a host device hosting the virtual resource. For example, a host device can provide a migration, suspend, or halt notification and an identifier of a virtual resource to a network device implementing process 1200. The network device can, at 1223, update provisioning based on the change of state information. For example, a network device can deprovision a virtual switch module and/or port based on the notification and/or configuration template related to the virtual resource. In other embodiments, a change in status of a virtual machine can be a change in a security parameter, and an ACL at a port and/or at a virtual switch module hosted by a host device can be updated by the network device, at 1223. In some embodiments, a configuration of a port of a network device and/or a virtual switch module hosted by a host device can be updated by an external management entity, a network management module, and/or an access switch.

In some embodiments, a change in a virtual resource can be an instantiation of a virtual machine. In such embodiments, update provisioning 1223 can include steps 1211, 1212, 1215 and 1216 to provide provisioning for the instantiated virtual resource. In some embodiments, update provisioning 1223 includes providing a provisioning instruction to the virtual resource to cause the virtual resource to change state. For example, a network device can receive a migration notification associated with a virtual resource and can provide a provisioning instruction to the virtual resource to cause the virtual resource to shut down or suspend. The virtual resource can be migrated (e.g., transferred from one host device to another host device) and restarted. In some embodiments, one network device can provide the provisioning instruction to cause the virtual resource to change to a suspended state, and another network device can provide the provisioning instruction to cause the virtual resource to restart. After provisioning is updated, it is determined whether to continue waiting for data packets, at 1225. If the virtual resource is no longer running (e.g., the virtual resource has not been halted, stopped, paused, or migrated) on the host device, process 1200 can return to step 1211 to request information about additional virtual resources. If the virtual resource is still running on the host device, process 1200 can return to step 1221 to continue to wait for data packet to or from the virtual resource.

In some embodiments, a network device can concurrently implement multiple processes 1200. For example, an access switch can manage or implement an instance of process 1200 for each virtual resource detected by the access switch. In some embodiments, process 1200 can include additional steps and/or fewer steps than illustrated in FIG. 12. For example, in some embodiments, a network device is not provisioned based on a configuration template. In some embodiments, a single process 1200 (or instance of process 1200) is implemented on a network device for all the virtual resources detected by the network device. Accordingly, process 1200 can include additional steps for managing the state of each virtual resource detected by the network device. For example, after deprovisioning a port and/or a virtual switch module after a timeout, process 1200 can include additional steps to determine whether additional virtual resource have already been detected and provisioned by the network device, and return to step 1221 to wait for data packets to or from already detected and provisioned virtual resourced. In some embodiments, a virtual switch module is not provisioned. In some embodiments, a port of a network device is not provisioned.

In some embodiments, a virtual resource can provide a migration notification to a network device including an identifier of a host device to which the virtual resource will migrate. The network device can deprovision a port and/or a virtual switch module, and provide a notification to the network device connected to the host device identified by the identifier sent by the virtual resource that the virtual resource will migrate to the host device. That network device can receive the notification and provision resources based on information included in the notification. For example, the notification can include an identifier of the virtual resource or a service provided by the virtual resource, an identifier of the host device to which the virtual resource will migrate, and/or other information associated with the migration or provisioning. In some embodiments, another device such as a network device, an external management entity, a host device, another virtual resource, and/or another device can provide a notification related to migration, instantiation, or change in the operational state of a virtual resource.

In some embodiments, process 1200 includes one or more steps to determine whether an identifier provided by a host device is related to a virtual resource for which provisioning instructions have been provided. In some embodiments, additional provisioning instructions are not provided for a virtual resource if provisioning instructions have already been provided. In some embodiments, provisioning instructions are provided to update prior provisioning.

In some embodiments, a port and/or a virtual switch module is provisioned based on more than one configuration template. For example, a port can be provisioned for a first configuration template and a second configuration template. Process 1200 can include steps for merging the first and second configuration templates and applying the merged or composite configuration template to the port. In some embodiments, configuration instructions for a virtual switch module can be modified based on modification to configuration instructions for a port. For example, conflicting provisioning instructions can be removed from port provisioning portions of first and second configuration templates and moved to virtual switch module portions of the first and second configuration templates. Thus, each provisioning instruction for a virtual resource can be applied to the resource without conflicting configurations at a port of a network device. Similarly, provisioning instructions can be moved from virtual switch module portions of configuration templates to port portions of configuration templates.

Figure 13:
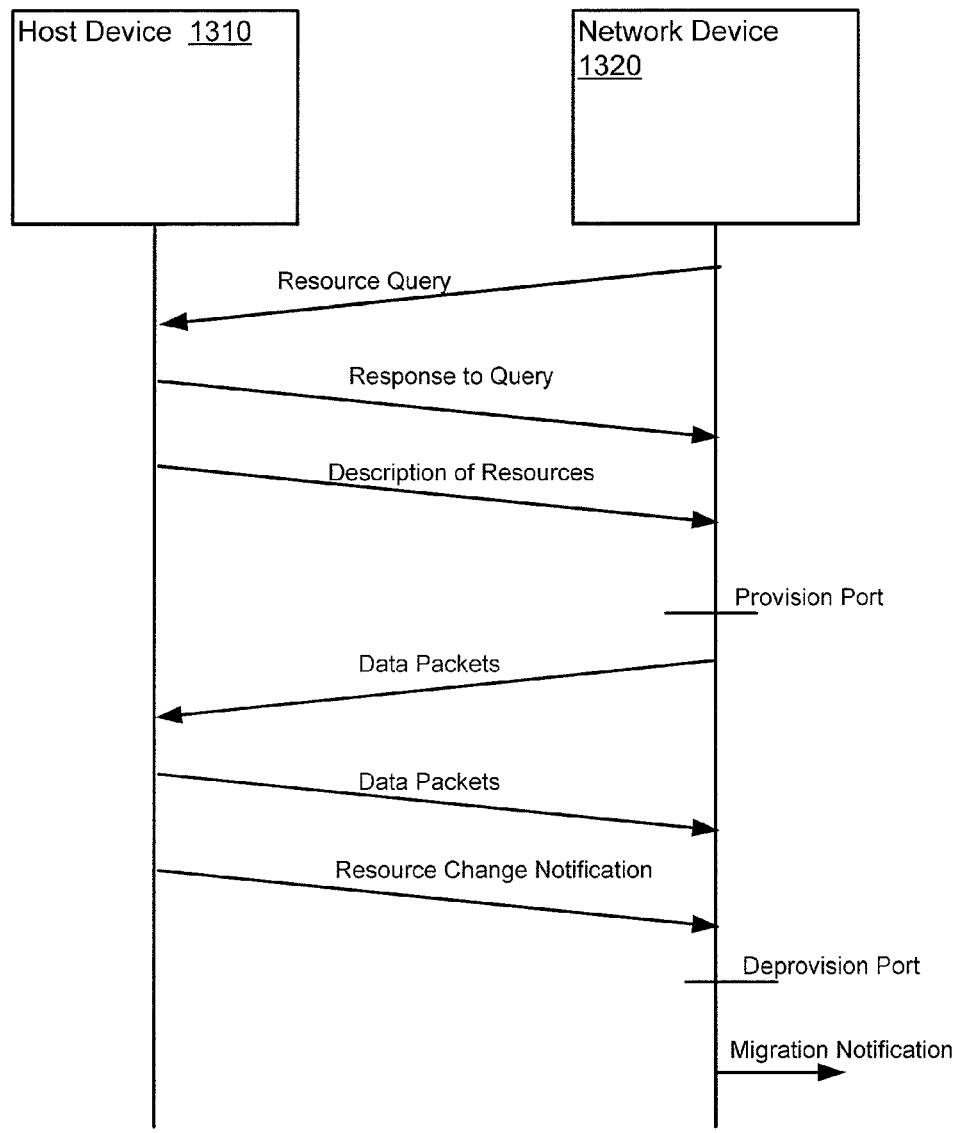
FIG. 13 illustrates communication flow in a system for provisioning for a virtual resource in a network based on a discovery protocol, according to an embodiment.

FIG. 13 illustrates communication flow in a system for provisioning for a virtual resource in a network based on a discovery protocol, according to an embodiment. As illustrated in FIG. 13, network device 1320 and host device 1310 send information or data packets one to another to provide provisioning of virtual resources hosted by host device 1310. Network device 1320 sends a resource query to host device 1310 to discover or determine which virtual resources are hosted by host device 1310. Host device 1310 responds to the query and includes a description of the virtual resources hosted by host device 1310 to network device 1320. In some embodiments, host device 1310 can respond to the query with an acknowledgement to network device 1320, and then provide separately a description of the virtual resources hosted by host device 1310 to network device 1320.

Based on the description provided by host device 1310, network device 1320 determines appropriate provisioning for a port of network device 1320 operatively coupled to the virtual resources hosted by host device 1310 and provides the provisioning. For example, network device 1320 can determine and provide provisioning such as, for example, provisioning instructions as discussed above with respect to process 1000 and/or process 1200. In some embodiments, provisioning instructions are provided to host device 1310 for provisioning a virtual switch module and/or other modules hosted by host device 1310. After the provisioning (e.g., one or more ports of network device 1320 and/or a virtual switch module hosted by host device 1310), data packets can be exchanged between the virtual resources hosted by host device 1310, network device 1320 and other device with which network device 1320 is in communication. For example, a virtual resource hosted by host device 1310 can be an electronic mail server and clients can access the electronic mail server via the Internet to which network device 1320 is connected via a switch fabric in a data center.

In some embodiments, host device 1310 can provide network device 1320 with a resource change notification associated with a change or future change in the status or state of a virtual resource hosted by host device 1310. Such a notification can indicate that a virtual resource will be shutdown, restarted, and/or migrated. Network device 1320 can acknowledge the notification and provide deprovisioning and/or provisioning to appropriately handle to notification. For example, if a virtual resource will be shutdown, network device 1320 can deprovision the virtual port operatively coupled to that virtual resource. In some embodiments, network device 1320 can provide deprovisioning instructions to host device 1310. If a virtual resource will restart, the network device can acknowledge the notification, save state information associated with the virtual resource, and provide provisioning instructions after the virtual resource has restarted based on the saved state information. If a virtual resource will be migrated, network device 1320 can deprovision a virtual port operatively coupled to that virtual resource, and provide a notification of the migration to the host device to which the virtual resource will be migrated. Additionally, a migration notification can be provided to a network device to which the virtual resource will be operatively coupled after the migration.

In some embodiments, a network device can update provisioning of a port in response to a resource change notification, and a host device and network device can continue exchanging data packets after the provisioning is updated. For example, a resource change notification can include instructions for updating provisioning of a network device port operatively coupled to a virtual resource in response to a change in a security policy or requirement of the virtual resource. The network device can update the provisioning of the port and continue exchanging data with the virtual resource.

In some embodiments, a resource change notification can be provided by an external management entity. In some embodiments, a resource change notification can be provided by a network management module. In some embodiments, a resource change notification can be provided by a virtual resource. In some embodiments, a resource change notification can be provided by a network device. In some embodiments, a network device does not receive a resource change notification, but can detect that a virtual resource has changed an operational state. For example, a network device can detect based on a timeout value and/or data sent to and/or from a virtual resource that the virtual resource has changed an operation state (e.g., has been migrated, has suspended, has resumed, and/or has been instantiated).

FIG. 14 is a system block diagram of a network within a data center including a dynamic provisioning system, according to an embodiment. As illustrated in FIG. 14, dynamic provisioning system 1420 is operatively coupled to switch fabric 1430 and host device 1412, host device 1414, host device 1416, host device 1418, and host device 1440. Dynamic provisioning system 1420 is configured to operatively couple host devices to switch fabric 1430 and provide provisioning for virtual resources hosted on host devices in resource mobility domain 1410.

Resource mobility domain 1410 is a group of host devices among which virtual resources can migrate. As illustrated in FIG. 14, host device 1412, host device 1414, host device 1416, and host device 1418 are included in resource mobility domain 1410. Host device 1440 is not included in resource mobility domain 1410. Thus, a virtual resource hosted by host device 1414 can migrate to any of host device 1412, host device 1416, and host device 1418. For example, an external management entity (not shown in FIG. 14) can be configured to migrate virtual machines only among the host devices included in resource mobility domain 1410.

Dynamic network provisioning system 1420 includes network device 1422, network device 1424, network device 1426, and network device 1428. Network device 1422 is operatively coupled to host device 1412, host device 1414 and switch fabric 1430. Network device 1424 is operatively coupled to host device 1416 and switch fabric 1430. Network device 1426 is operatively coupled to host device 1418 and switch fabric 1430. Network device 1428 is operatively coupled to host device 1440 and switch fabric 1430. Each network device in dynamic provisioning system 1420 includes a library of configuration templates related to the virtual resources that can be hosted by host devices in resource mobility domain 1410. Accordingly, any host device in resource mobility domain 1410 can be connected to any network device in dynamic provisioning system 1420 and receive provisioning as described above, for example, with respect to process 1000 and/or process 1200.

In other words, dynamic provisioning system 1420 is configured to provide dynamic provisioning for any virtual resource hosted by any host device in resource mobility domain 1410. Accordingly, any host device in resource mobility domain 1410 can be connected to any network resource in dynamic provisioning system 1420, and a virtual machine instantiated on or migrated to that host device can be provisioned by the network device to which that host device is connected. For example, host device 1412 can be disconnected from network device 1422 and connected to network device 1428. Network device 1428 can detect or query host device 1412 regarding virtual resources hosted by host device 1428, determine appropriate provisioning, and apply the provisioning without manual or administrator configuration or network topology description updates as discussed above in relation to, for example, FIGS. 10 and 12.

Such a system can be particularly beneficial in environments such as data centers with many network device and many host devices. Because of many factors including the number of host device and network device, the number of ports on each network device, down-time and/or failure of host device, and operator error, manual configuration of networks and network connections between host devices and network devices can be complex and error-prone. Embodiments described herein mitigate the difficulties in administration of such systems because the interconnections among the components of the system (e.g., host device and network devices) can vary dynamically without reconfiguration of the system.

Referring again to FIG. 14, an administrator can designate which host devices are included in resource mobility domain 1410. In some embodiments, the administrator specifies in an external management entity (not shown) which host devices can host certain virtual resources. The external management entity can then only move or migrate virtual resources to the host devices included in the mobility domain. Thus, in some embodiments, a mobility domain can be configured in a software application and that software application can enforce or effect the mobility domain. In some embodiments, the administrator provides manual commands (e.g., via a command line interface) to migrate, instantiate, suspend, etc. virtual resources and, thus, manually administers or implements resource mobility domain 1410. As discussed in relation to FIG. 6, an external management entity can be in communication with network devices such that it provides configuration templates including provisioning instructions to network devices.

In some embodiments, a mobility domain is defined by the configuration templates available to one or more network devices. For example, network devices can provision ports and/or virtual switch modules for any virtual resource for which it has a configuration template. Thus, a mobility domain of the virtual resources for which one or more network device have access to configuration templates is the set of host devices attached or operatively coupled to those network devices.

Configuration templates associated with virtual resources that can be hosted by host devices in resource mobility domain 1410 are compiled into a library, list, or database and provided to one or more network devices of dynamic provisioning system 1420 by, for example an external management entity (not shown). In some embodiments, each network device of dynamic provisioning system 1420 includes the library of configuration templates. In some embodiments, some network devices in dynamic provisioning system 1420 are related to one resource mobility domain and receive configuration templates associated with that resource mobility domain, and other network devices in dynamic provisioning system 1420 are related to another resource mobility domain and receive configuration templates associated with the other resource mobility domain. In some embodiments, some network devices in dynamic provisioning system 1420 receive two or more libraries of configuration templates, each library related to a different resource mobility domain. In some embodiments, the network devices of dynamic provisioning system 1420 have access to a common memory such as, for example, a database and commonly access one or more libraries of configuration templates.

In some embodiments, methods and apparatus described herein can improve convergence in a network such as, for example, a data center network after migration of a virtual resource. Convergence in a network can refer to, for example, the process in a network whereby network devices and virtual switch modules in the network have been properly provisioned such that a data packet with a destination address of a virtual resource will be delivered to that virtual resource. Additionally, convergence can refer to the process whereby the network policies, rules, and/or access restrictions related to the virtual resource have been applied to the ports (e.g., network device ports and/or virtual ports of a virtual switch module) to which the virtual resource is operationally coupled. In other words, a network has converged when the provisioning of the devices in the network have been updated to reflect a change in the network such as, for example, the migration of a virtual resources. In some embodiments, convergence can refer to the time when the network has converged after a migration or instantiation of a virtual resource.

Using methods and apparatus discussed above, network devices can coordinate with virtual resources, host devices, and/or external management entities to improve the rate of convergence in a network. For example, network devices can receive and provide migration notifications prior to the migration of a virtual resource. The network devices can provide provisioning instructions to virtual switch modules, virtual resources, and/or can provision ports of the network devices such that provisioning is accomplished prior to or nearly concurrent with the completed migration of the virtual resource. In some embodiments, network devices can prepare to provide provisioning instructions and/or provision ports of the network device in response to migration notifications, and can complete the provisioning after receiving an indication from the virtual resource that it has been restarted. In some embodiments, an indication can be, for example, a broadcast packet (e.g., a gratuitous address resolution protocol ("ARP") packet or signal) sent by the virtual resource.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language. A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; read-only memory ("ROM"); and random-access memory ("RAM") devices such as solid state or FLASH drives. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

While certain embodiments have been shown and described above, various changes in form and details may be made. For example, some features of embodiments that have been described in relation to one embodiment and/or process for provisioning a host device or network device can be useful in other embodiments and/or processes. Additionally, embodiments described with reference to specific forms of communication such as communication between host device, network devices, network management modules, and external management entities via a network are also applicable to other forms of communication such as communication via a command or control plane. Some embodiments that have been described in relation to a software implementation can be implemented as digital or analog hardware. For example, software modules can be implemented on semiconductor chips. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A method, comprising:
receiving, at a network device, a migration notification associated with migration of a first virtual resource to a host device operatively coupled without an intervening switching device of a switch fabric to a port of the network device;
detecting, at the network device and in response to the migration notification, the first virtual resource hosted by the host device;
selecting at the network device after the detecting a first configuration template associated with the first virtual resource from a library of configuration templates accessible to the network device;
provisioning the port of the network device based on the first configuration template associated with the first virtual resource;
detecting a second virtual resource hosted by the host device;
selecting a second configuration template associated with the second virtual resource from the library of configuration templates accessible to the network device;
defining a composite configuration template based on the first configuration template and the second configuration template; and
provisioning the port of the network device such that the network device is provisioned based on the composite configuration template.

2. The method of claim 1, wherein the detecting the first virtual resource is at a first time, the method further comprising: determining at a second time after the first time that the first virtual resource is not hosted by the host device, the determining being based on an expiration of a timeout period; and deprovisioning the port of the network device based on the first configuration template associated with the first virtual resource after the determining.

3. The method of claim 1, wherein the detecting the first virtual resource is at a first time, the method further comprising: determining at a second time after the first time that the first virtual resource is not hosted by the host device, the determining being based on a data set received by the network device from the host device; and deprovisioning the port of the network device after the determining based on the first configuration template associated with the first virtual resource after the determining.

4. The method of claim 1, wherein the receiving is at a first time, the host device is a first host device, and the port is a first port the method further comprising:
  determining at a second time after the first time that the first virtual resource is not hosted by the first host device;
  deprovisioning the first port of the network device based on the first configuration template associated with the first virtual resource after the determining;
  detecting at a third time after the second time that the first virtual resource is hosted by a second host device operatively coupled to the network device, the second host device operatively coupled to a second port of the network device;
  selecting the first configuration template associated with the first virtual resource from the library of configuration templates accessible to the network device;
  provisioning the second port of the network device based on the first configuration template associated with the first virtual resource.

5. The method of claim 1, wherein host device includes a virtual switch module in communication with the first virtual resource, the method further comprising providing a provisioning instruction based on the first configuration template to the virtual switch module, the virtual switch module being configured in response to the provisioning instruction such that data packets received by the network device and associated with the first virtual resource are forwarded to the first virtual resource via the virtual switch module.

6. The method of claim 1, wherein the provisioning is based on a first portion of the first configuration template associated with the first virtual resource, the method further comprising providing a provisioning instruction based on a second portion of the first configuration template to a virtual switch module, the virtual switch module being configured in response to the provisioning instruction such that data packets received by the network device and associated with the first virtual resource are forwarded to the first virtual resource via the virtual switch module.

7. The method of claim 1, wherein:
  the migration notification includes a network resource identifier associated with the first virtual resource; and
  the selecting is based on the network resource identifier.

8. The method of claim 1, further comprising: requesting from the host device data associated with virtual resources hosted by the host device before the detecting the first virtual resource.

9. A system, comprising:
  a first network device having a port configured to be operatively coupled without an intervening switching device of a switch fabric to a first host device; and
  a second network device operatively coupled to the first network device via the switch fabric and having a port configured to be operatively coupled without an intervening switching device of the switch fabric to a second host device,
  the first network device configured to receive a migration notification associated with a migration of a first virtual resource from the first host device to the second host device, the first network device configured to provision the port of the first network device in response to the migration notification and based on a first configuration template associated with the first virtual resource from a library of configuration templates,
  the second network device configured to provision the port of the second network device in response to the migration notification,
  the second network device configured to detect a second virtual resource hosted by the second host device,
  the second network device configured to select a second configuration template associated with the second virtual resource from the library of configuration templates,
  the second network device configured to define a composite configuration template based on the first configuration template and the second configuration template,
  the second network device configured to provision the port of the second network device such that the second network device is provisioned based on the composite configuration template.

10. The system of claim 9, wherein the first network device is configured to send a portion of the migration notification to the second network device.

11. The system of claim 9, wherein:
  the first network device is configured to provision the port of the first network device in response to the migration notification when the first virtual resource is hosted by the first host device; and
  the second network device is configured to provision the port of the second network device in response to the migration notification when the first virtual resource is hosted by the second host device.

12. The system of claim 9, wherein the first network device is configured to deprovision the port of the first network device in response to the migration notification.

13. The system of claim 9, further comprising a control plane, and wherein the first network device and the second network device are operatively coupled via the control plane.

14. An apparatus, comprising: a network interface configured to communicate with a communication network; a first communication interface configured to communicate with a first host device when the first host device is operatively coupled to the first communication interface without an intervening switching device of a switch fabric, the first communication interface configured to receive a migration notification at a first time from the first host device in response to a virtual resource migrating to the first host device; a memory configured to store a library of configuration templates; and a processor operatively coupled to the network interface, the first communication interface, and the memory, the processor configured to select a first configuration template from the library of configuration templates based on the migration notification received from the first host device, the processor configured to provision the first communication interface based on the first configuration template, the processor configured to determine at a second time after the first time that the virtual resource is not hosted by the first host device, the processor configured to deprovision the first communication interface based on the first configuration template, the processor configured to detect at a third time after the second time that the virtual resource is hosted by a second host device operatively coupled to a second communication interface, the processor configured to select the first configuration template associated with the virtual resource from the library of configuration templates, the processor configured to provision the second communication interface based on the first configuration template associated with the virtual resource.

15. The apparatus of claim 14, wherein the processor is configured to send a provisioning instruction to a virtual switch module hosted by the first host device via the first communication interface based on the first configuration template.

16. The apparatus of claim 14, wherein:
the migration notification is associated with the virtual resource hosted by the first host device;
the processor is configured to deprovision the first communication interface based on the first configuration template after termination of the virtual resource on the first host device.

17. The apparatus of claim 14, wherein the processor is configured to request from the first host device over the first communication interface information associated with virtual resources hosted by the first host device.

18. The apparatus of claim 14, wherein the processor is configured to receive from the first host device over the first communication interface an operational status of a virtual resource hosted by the first host device.

* * * * *